United States Patent
Kimura

(10) Patent No.: US 10,001,857 B2
(45) Date of Patent: Jun. 19, 2018

(54) DISPLAY APPARATUS AND METHOD OF CONTROLLING DISPLAY APPARATUS

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/149,710

(22) Filed: May 9, 2016

(65) Prior Publication Data
US 2016/0334911 A1 Nov. 17, 2016

(30) Foreign Application Priority Data

May 13, 2015 (JP) ................................ 2015-097943
Mar. 4, 2016 (JP) ................................ 2016-041864

(51) Int. Cl.
| | |
|---|---|
| G06F 3/041 | (2006.01) |
| G02B 27/01 | (2006.01) |
| G06F 3/0488 | (2013.01) |
| G06F 3/0346 | (2013.01) |
| G06F 3/0354 | (2013.01) |

(52) U.S. Cl.
CPC ....... G06F 3/0412 (2013.01); G02B 27/0172 (2013.01); G06F 3/0346 (2013.01); G06F 3/03547 (2013.01); G06F 3/0488 (2013.01); *G02B 2027/014* (2013.01); *G02B 2027/0178* (2013.01); *G06F 2203/04808* (2013.01)

(58) Field of Classification Search
CPC .. G06F 3/0412; G06F 3/0346; G06F 3/03547; G06F 3/0488; G06F 2203/04808; G02B 27/0172; G02B 27/014; G02B 27/0178
See application file for complete search history.

(56) References Cited

U.S. PATENT DOCUMENTS 9,244,562 B1 * 1/2016 Rosenberg .......... G06F 3/04847
2009/0153288 A1 6/2009 Hope et al.
(Continued)

FOREIGN PATENT DOCUMENTS

EP 2631767 A2 8/2013
JP 2010-259493 A 11/2010
(Continued)

OTHER PUBLICATIONS

Oct. 12, 2016 Extended Search Report issued in European Patent Application No. 16169606.7.

*Primary Examiner* — Peter D McLoone
(74) *Attorney, Agent, or Firm* — Oliff PLC

(57) ABSTRACT

A display apparatus includes an image display unit that allows a user to view an image. The display apparatus includes an operation detection unit that detects an operation on a track pad and a control unit that displays an operation target display object on the image display unit. The control unit controls a display position of the display object in response to an operation on the track pad, obtains a movement direction of the display object in response to a change in an operation position on the track pad, moves the display position of the display object, and stops moving the display object in a case in which an operation on the track pad corresponds to a preset ending condition.

18 Claims, 21 Drawing Sheets

(56) References Cited

U.S. PATENT DOCUMENTS

| | | | |
|---|---|---|---|
| 2010/0091027 A1* | 4/2010 | Oyama | G02B 27/0068 |
| | | | 345/581 |
| 2010/0164897 A1 | 7/2010 | Morin et al. | |
| 2013/0222243 A1* | 8/2013 | Jung | G06F 1/1694 |
| | | | 345/158 |
| 2014/0306899 A1 | 10/2014 | Hicks | |
| 2015/0103021 A1 | 4/2015 | Lim et al. | |

FOREIGN PATENT DOCUMENTS

| | | |
|---|---|---|
| JP | 2013-143076 A | 7/2013 |
| JP | 5323070 B2 | 10/2013 |
| WO | 2009/006221 A1 | 1/2009 |

\* cited by examiner

DISPLAY APPARATUS AND METHOD OF CONTROLLING DISPLAY APPARATUS

BACKGROUND

1. Technical Field

The present invention relates to a display apparatus and a method of controlling the display apparatus.

2. Related Art

In the related art, devices that include operation surfaces on which touch operations are detected are known as input devices operating computers or the like (for example, see JP-A-2013-143076). The JP-A-2013-143076 discloses a configuration in which a computer assumed to be operated using a mouse is operated by a touch panel terminal. In input devices detecting operations on operation surfaces, there are restrictions on operability due to the sizes of the operation surfaces. To resolve such restrictions, a movement distance is calculated from a speed at which a spot in which a touch is detected by a touch panel is moved and a mouse pointer is moved on a computer according to the movement distance in the configuration disclosed in JP-A-2013-143076.

However, in a case in which an index of an operation of a mouse pointer or the like is moved from a speed related to an operation, as disclosed in JP-A-2013-143076, it is difficult for an operator (user) to control a position at which the index is stopped, that is an ending position of an operation.

SUMMARY

An advantage of some aspects of the invention is that it provides a display apparatus capable of enabling an operation on an operation surface to be performed and enabling an operator to easily control an ending point of an operation by easing restriction on operability caused due to the size of the operation surface.

A display apparatus according to an aspect of the invention includes: a display unit; an operation detection unit that detects an operation on an operation surface; and a control unit that causes the display unit to display an operation target display object and controls a display position of the display object in response to an operation on the operation surface. The control unit moves the display position of the display object in response to a change in an operation position on the operation surface detected by the operation detection unit and stops moving the display position of the display object in a case in which the operation detection unit detects an operation corresponding to a preset ending condition.

According to the aspect of the invention, it is possible to control the movement amount of the display position with a high degree of freedom in a case in which the display position of the display object is moved according to an operation on the operation surface. For example, when the operation is set not to correspond to the ending condition despite stop of the operation position on the operation surface, it is possible to move the display object greater than the movement amount of the operation position. It is possible to ease restriction on operability caused due to the size of the operation surface. Further, it is possible to easily control a position or a timing at which the movement of the display position of the display object is stopped.

In the aspect of the invention, the control unit may set a movement direction of the display position of the display object to a direction corresponding to a movement direction of the operation position on the operation surface.

According to the aspect of the invention with this configuration, the operator can move the operation target display object in an intended direction, and this is possible to achieve an improvement in the operability.

In the aspect of the invention, after the operation detection unit detects an operation on the operation surface, the control unit may perform a process of obtaining the movement direction of the display position of the display object and subsequently move the display position of the display object.

According to the aspect of the invention with this configuration, it is possible to move the operation target display object in an appropriate direction.

In the aspect of the invention, after the operation detection unit detects an operation on the operation surface, the control unit may display the display object at the display position corresponding to the operation position of the operation surface while a process of obtaining a movement direction of the display position of the display object is performed.

According to the aspect of the invention with this configuration, it is possible to appropriately control the display position of the display object while the process of obtaining the movement direction of the display object is performed. Therefore, the operator can perform an operation without difficulty. It is possible to move the display object in a short time or in response to an operation in which a movement amount of the operation position is small.

In the aspect of the invention, the control unit may set a movement speed of the display position of the display object to a speed corresponding to a movement amount or a movement speed of the operation position on the operation surface.

According to the aspect of the invention with this configuration, since the operator can easily control the movement speed of the display object, it is possible to further achieve the improvement in the operability.

In the aspect of the invention, the control unit may change at least one of a movement speed and a movement direction of the display position of the display object in a case in which the operation position on the operation surface detected by the operation detection unit is changed during movement of the display position of the display object.

According to the aspect of the invention with this configuration, after the movement of the display position of the display object starts, at least one of the movement direction and the movement speed of the display position is changed according to the operation. Therefore, even after the movement of the display position of the display object is started by the operation by the operator, the operator can adjust the movement direction or the movement speed of the display object.

In the aspect of the invention, the control unit may detect the operation position in a case in which the operation detection unit detects a touch of an operation body on the operation surface, and the control unit may determine that the operation corresponds to the ending condition in a case in which the operation detection unit detects that the operating body is detached from the operation surface and the touch is released.

According to the aspect of the invention with this configuration, since the operator can easily give an instruction of timings at which the movement of the display position of the display object starts and stops, it is possible to further achieve the improvement in the operability.

In the aspect of the invention, the control unit may detect the operation position in a case in which the operation detection unit detects a touch of an operation body on the operation surface, and the control unit may determine that the operation corresponds to the ending condition in a case in which the operation detection unit detects that the operating body is detached from the operation surface, the touch is released, and then a predetermined time passes.

According to the aspect of the invention with this configuration, even after the operating body is detached from the operation surface, it is possible to continuously move the display position of the display object. Therefore, it is possible to move the display position of the display object greater than the movement amount of the operation position on the operation surface, and thus it is possible to avoid restriction on the size of the operation surface.

In the aspect of the invention, the control unit may change at least one of a movement speed and a movement direction of the display position of the display object in response to an operation position of a new touch detected by the operation detection unit in a case in which the operation detection unit detects that the operating body is detached from the operation surface and a touch is released, and then the operation detection unit may detect a touch on the operation surface within a predetermined time.

According to the aspect of the invention with this configuration, even after the operating body is detached from the operation surface, it is possible to control the movement direction or the movement speed of the movement of the display position of the display object. Therefore, it is possible to control a form of the movement of the display position of the display object with the high degree of freedom.

In the aspect of the invention, the display apparatus may further include an operation device that has the operation surface; and a posture detection unit that detects a posture of the operation device or a change in the posture. The control unit may change at least one of a movement speed and a movement direction of the display position of the display object in response to the posture of the operation device or the change in the posture detected by the posture detection unit during movement of the display position of the display object.

According to the aspect of the invention with this configuration, by changing the posture of the operation device while the display position of the display object is moved, it is possible to control the movement direction or the movement speed of the display position of the display object. Therefore, it is possible to control the form of the movement of the display position of the display object with the high degree of freedom through a simple operation.

In the aspect of the invention, an area or a size in which the operation detection unit detects an operation on the operation surface may be less than an area or a size of a display region in which an image is displayed by the display unit.

According to the aspect of the invention with this configuration, the display object can be moved arbitrarily using the operation surface smaller than the display region, and thus it is possible to achieve the improvement in the operability. Further, there is the advantage of improving the degree of freedom of the configuration of the apparatus.

In the aspect of the invention, a shape of the operation surface may be a different shape from a display region in which an image is displayed by the display unit.

According to the aspect of the invention with this configuration, the display object can be moved arbitrarily using an operation surface with a different shape from the display region, and thus it is possible to achieve the improvement in the operability. Further, there is the advantage of improving the degree of freedom of the configuration of the apparatus.

A display apparatus according to another aspect of the invention includes: a display unit; an operation detection unit that detects an operation on an operation surface; and a control unit that generates input data on a virtual input plane according to an operation detected by the operation detection unit. The control unit starts generating the input data on the virtual input plane in response to an operation of moving an operation position on the operation surface in a case in which the operation detection unit detects the operation, and the control unit stops generating the input data in a case in which the operation detection unit detects an operation corresponding to a preset ending condition.

According to the aspect of the invention, it is possible to generate the input data on the virtual input plane beyond the restriction on the size of the operation surface. For example, the display position of the display object is moved based on the input data, and thus it is possible to control the movement amount of the display position of the display object with the high degree of freedom. Accordingly, it is possible to ease the restriction on the operability caused due to the size of the operation surface.

In the aspect of the invention, the input data generated by the control unit may include at least one of an input position on the virtual input plane, a movement direction of the input position inside the virtual input plane, and a movement speed of the input position inside the virtual input plane.

According to the aspect of the invention with this configuration, it is possible to input the input position, the movement direction of the input position, or the movement speed of the input position on the virtual input plane through an operation on the operation surface.

In the aspect of the invention, the control unit may set at least one of the movement direction of the input position inside the virtual input plane and the movement speed of the input position inside the virtual input plane, which are included in the input data, according to a movement speed or a movement amount of the operation position detected by the operation detection unit.

According to the aspect of the invention with this configuration, it is possible to control the input position on the virtual input plane, the movement direction of the input position, or the movement speed of the input position through an operation on the operation surface.

In the aspect of the invention, the operation detection unit may detect a touch position as an operation position according to an operation of touching the operation surface with an operating body. The control unit may determine that the operation corresponds to the ending condition and stops generating the input data in a case in which the operation detection unit detects the touch on the operation surface is released.

According to the aspect of the invention with this configuration, since the operator can easily give an instruction of timings at which the generation of the input data starts and stops, it is possible to further achieve the improvement in the operability.

In the aspect of the invention, the control unit may determine that the operation corresponds to the ending condition and stops generating the input data in a case in which the operation detection unit detects that a touch on the operation surface is released and a predetermined time passes.

According to the aspect of the invention with this configuration, even after the operating body is detached from the operation surface, it is possible to continuously generate the input data. For example, in a case in which the display position of the display object is moved in correspondence to the input data, the movement of the display position can be continued even after releasing of a touch on the operation surface. Therefore, the input data can be input without being limited to the movement amount of the operation position on the operation surface, and thus it is possible to avoid the restriction on the size of the operation surface.

In the aspect of the invention, the control unit may be able to generate three-dimensional input data including the virtual input plane and a direction perpendicular to the virtual input plane according to an operation detected by the operation detection unit, and generate the input data including a component of the direction perpendicular to the virtual input plane in a case in which the operation detection unit detects an operation at a plurality of operation positions on the operation surface.

According to the aspect of the invention with this configuration, it is possible to perform a three-dimensional input through an operation on the operation surface.

In the aspect of the invention, the display apparatus may further include an operation device that has the operation surface; and a posture detection unit that detects a posture of the operation device or a change in the posture. The control unit may change correspondence between the operation surface and the virtual input plane in response to the posture of the operation device detected by the posture detection unit or the change in the posture.

According to the aspect of the invention with this configuration, it is possible to change the direction of the input data through an operation of inclining the operation device including the operation surface.

In the aspect of the invention, the virtual input plane may be associated with a display region of the display unit. The control unit may cause the display unit to display an operation target display object and controls a display position of the display object in correspondence to the input data.

According to the aspect of the invention with this configuration, it is possible to move the display position of the display object according to an operation on the operation surface, and thus it is possible to control the movement amount of the display position with the high degree of freedom.

A method of controlling a display apparatus according to still another aspect of the invention includes: controlling the display apparatus including a display unit; detecting an operation on an operation surface; causing the display unit to display an operation target display object and controlling a display position of the display object in response to an operation on the operation surface; and moving the display position of the display object in response to a change in an operation position on the operation surface and stopping moving the display position of the display object in a case in which an operation corresponding to a preset ending condition is detected on the operation surface.

According to the aspect of the invention, in a case in which the display position of the display object is moved according to the operation on the operation surface, it is possible to control the movement amount of the display position with the high degree of freedom. For example, when the operation is set not to correspond to the ending condition despite the stop of the operation position on the operation surface, it is possible to move the display object greater than the movement amount of the operation position. It is possible to ease the restriction on the operability caused due to the size of the operation surface. Further, it is possible to easily control a position or a timing at which the movement of the display position of the display object is stopped.

A program according to yet another aspect of the invention can be executed by a computer controlling a display apparatus including a display unit. The program causes the computer to function as: an operation detection unit that detects an operation on an operation surface; and a control unit that causes the display unit to display an operation target display object, controls a display position of the display object in response to an operation on the operation surface, obtains a movement direction of the display object in response to a change in an operation position on the operation surface, moves the display position of the display object in response to a change in an operation position on the operation surface detected by the operation detection unit, and stops moving the display position of the display object in a case in which the operation detection unit detects an operation corresponding to a preset ending condition.

By causing the computer to execute the program, it is possible to control the movement amount of the display position with a high degree of freedom in a case in which the display object at the operation target position displayed by the computer is moved according to an operation on the operation surface. For example, when the operation is set not to correspond to the ending condition despite stop of the operation position on the operation surface, it is possible to move the display object greater than the movement amount of the operation position. It is possible to ease restriction on operability caused due to the size of the operation surface. Further, it is possible to easily control a position or a timing at which the movement of the display position of the display object is stopped.

The aspect of the invention can be implemented in a form of a storage medium storing the above-described program, a server apparatus delivering the program, a transmission medium transmitting the program, and a data signal implementing the program in carrier waves. As the storage medium, any of a magnetic or optical storage medium and a semiconductor memory device may be used an another kind of storage medium may be used. The storage medium may be any one of a portable storage medium such as a memory card, a storage medium fixedly provided in the foregoing apparatus, and a storage medium included in an apparatus connected to the foregoing apparatus via a communication line. Any other specific implementation form can be used.

The foregoing program can be can be implemented as a single application program operating on an operating system in an apparatus in which the operating system is implemented to operate. The program is not limited to the single application program, but may be implemented as a plurality of functions of an operating system, a device driver, and an application program. For example, a device driver program controlling an operation device including an operation surface and/or a program module receiving an operation of the operation device on an operating system may cooperate to implement the foregoing program. The foregoing program according to the aspect of the invention may be implemented by a plurality of application programs and any specific program form can be used.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, an embodiment of the invention will be described with reference to the drawings.

Figure 1:
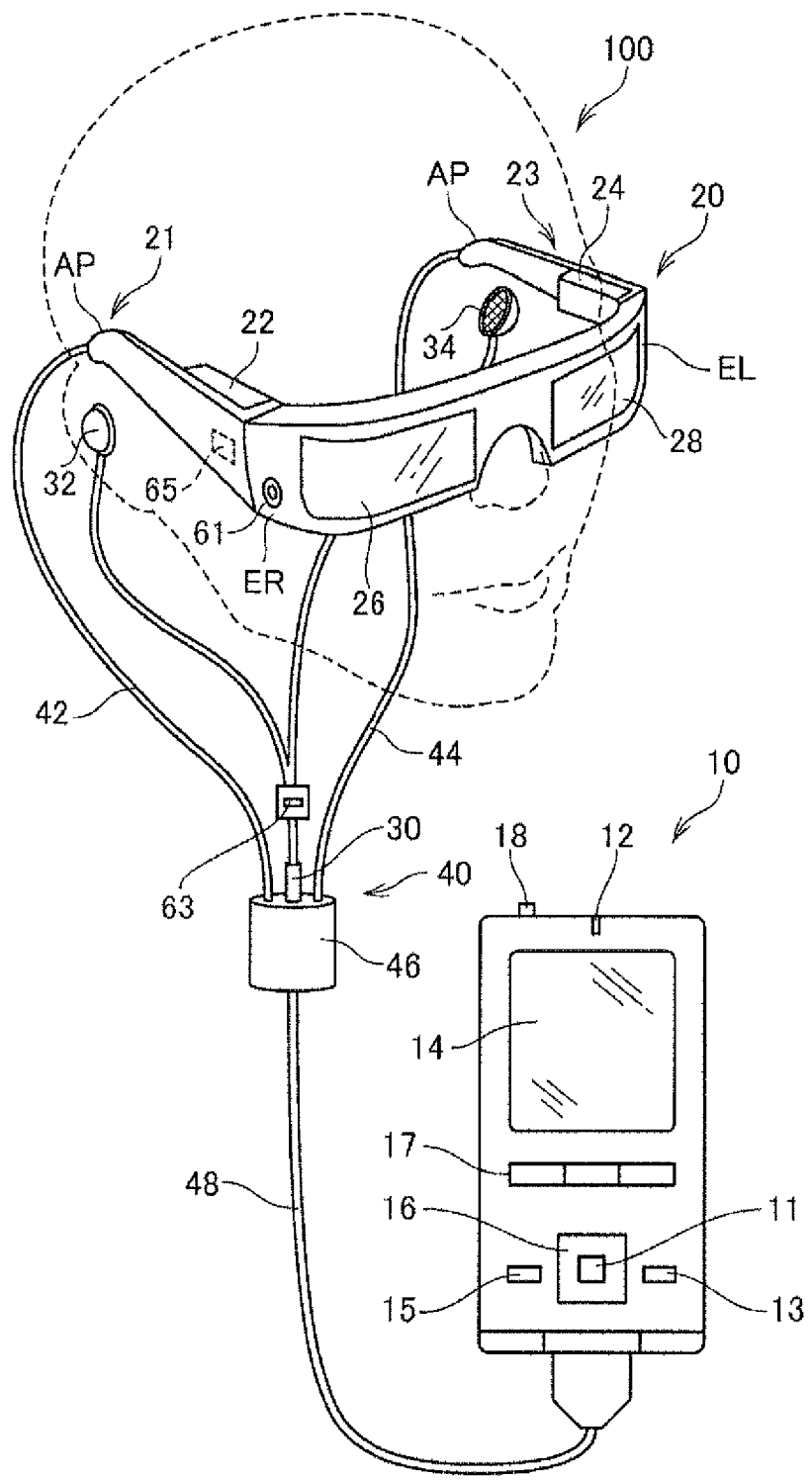
FIG. 1 is a diagram illustrating the exterior configuration of an HMD according to a first embodiment.

FIG. 1 is a diagram illustrating the exterior configuration of an HMD 100 according to a first embodiment to which the invention is applied. The HMD 100 is a display apparatus which is mounted on a head and is also referred to as a head mounted display (head mounted display apparatus). The HMD 100 according to the embodiment is an optical transmission type display apparatus which enables a user to view a virtual image and to also directly view an outside scenery simultaneously. In the present specification, a virtual image which the HMD 100 enables the user to view is also referred to as a "display image" for convenience. Emitting image light generated based on image data is also referred to as "displaying an image".

The HMD 100 includes an image display unit 20 (display unit) that enables the user to view a virtual image in a state in which the HMD 100 is mounted on the head of the user and a control device 10 that controls the image display unit 20. The control device 10 also functions as a controller used for the user to operate the HMD 100. The control device 10 functions as an operation device.

The image display unit 20 is a mounted body mounted on the head of the user and has a glasses shape in the embodiment. The image display unit 20 includes a right holding unit 21, a right display driving unit 22, a left holding unit 23, a left display driving unit 24, a right optical image display unit 26, a left optical image display unit 28, a camera 61, and a microphone 63. The right optical image display unit 26 and the left optical image display unit 28 are disposed to be located in front of the right and left eyes of the user when the image display unit 20 is mounted on the user. One end of right optical image display unit 26 and one end of the left optical image display unit 28 are connected to each other at a position corresponding to the middle of the forehead of the user when the image display unit 20 is mounted on the user.

The right holding unit 21 is a member formed to extend from an end portion ER which is the other end of the right optical image display unit 26 to a position corresponding to a temporal region of the user when the image display unit 20 is mounted on the user. Similarly, the left holding unit 23 is a member formed to extend from an end portion EL which is the other end of the left optical image display unit 28 to a position corresponding to a temporal region of the user when the image display unit 20 is mounted on the user. The right holding unit 21 and the left holding unit 23 hold the image display unit 20 on the head of the user like the temples (bows) of glasses.

The right display driving unit 22 and the left display driving unit 24 are disposed on opposite sides to the head of the user when the image display unit 20 is mounted on the user. The right display driving unit 22 and the left display driving unit 24 are also collectively referred to as "display driving units" simply, and the right optical image display unit 26 and the left optical image display unit 28 are also collectively referred to as "optical image display units" simply.

The display driving units 22 and 24 include liquid crystal displays 241 and 242 (hereinafter also referred to as "LCDs 241 and 242") and projection optical systems 251 and 252 (see FIG. 2). The details of the configurations of the display driving units 22 and 24 will be described below. The optical image display units 26 and 28 serving as optical members include light-guiding plates 261 and 262 (see FIG. 2). The light-guiding plates 261 and 262 are formed of a resin material or the like with a light transmission property and guide image light output from the display driving units 22 and 24 to the eyes of the user. In the embodiment, a case will be described in which the right optical image display unit 26 and the left optical image display unit 28 having the light transmission property to the extent that the user wearing the HMD 100 are used can at least view outside scenery.

The camera 61 is disposed at an end portion ER which is the other end of the right optical image display unit 26. The camera 61 images an outside scenery which is an outside scene in an opposite direction to the side of the eyes of the user and acquires an outside scenery image. The camera 61 according to the embodiment illustrated in FIG. 1 is a single-lens camera, but may be a stereo camera.

An imaging direction of the camera 61, that is, a view angle is a front side direction of the HMD 100, in other words, a direction in which at least a partial outside scenery in a view field direction of the user is imaged in a state in which the HMD 100 is mounted. The area of the view angle of the camera 61 can be appropriately set, but an imaging range of the camera 61 is preferably a range including externality viewed through the right optical image display unit 26 and the left optical image display unit 28 by the user. Further, the imaging range of the camera 61 is more preferably set so that the entire view field of the user through the right optical image display unit 26 and the left optical image display unit 28 can be imaged.

The image display unit 20 further includes a connection unit 40 connecting the image display unit 20 to the control device 10. The connection unit 40 includes a body cord 48 connected to the control device 10, a right cord 42, a left cord 44, and a connection member 46. The right cord 42 and the left cord 44 are two branched cords of the body cord 48. The right cord 42 is inserted into the casing of the right holding unit 21 from a front end AP of the right holding unit 21 in its extension direction to be connected to the right display driving unit 22. Similarly, the left cord 44 is inserted into the casing of the left holding unit 23 from a front end AP of the left holding unit 23 in its extension direction to be connected to the left display driving unit 24.

The connection member 46 is formed in a branching point of the body cord 48, the right cord 42, and the left cord 44 and has a jack for connecting an earphone plug 30. A right earphone 32 and a left earphone 34 extend from the earphone plug 30. The microphone 63 is formed near the earphone plug 30. Cords from the earphone plug 30 to the microphone 63 are collected as one cord. The cords are branched from the microphone 63 to be connected to the right earphone 32 and the left earphone 34.

In the microphone 63, as illustrated in FIG. 1, an audio collection unit of the microphone 63 is disposed to be oriented in a view line direction of the user, collects an audio, and outputs an audio signal to the audio processing unit 190. The microphone 63 may be, for example, a monaural microphone, a stereo microphone, a directional microphone with directivity, or an undirectional microphone.

The right cord 42 and the left cord 44 can also be collected into one cord. Specifically, a conductive wire inside the right cord 42 is drawn to the side of the left holding unit 23 through the body inside of the image display unit 20 and is coated with a resin along with a conductive wire inside the left cord 44 to be collected into one cord.

The image display unit 20 and the control device 10 transmits various signals via the connection unit 40. Connectors (not illustrated) fitted to each other are formed in the control device 10 and the end portion of the body cord 48 opposite to the connection member 46. The control device 10 and the image display unit 20 are connected or disconnected by fitting and releasing the fitting of the connector of the body cord 48 to the connector of the control device 10. In the right cord 42, the left cord 44, and the body cord 48, for example, a metal cable or an optical fiber can be adopted.

The control device 10 is a device that controls the HMD 100. The control device 10 includes switches such as a decision key 11, a lighting unit 12, a display switch key 13, a luminance switch key 15, a direction key 16, a menu key 17, and a power switch 18. The control device 10 includes a track pad 14 (operation surface) on which the user performs a touch operation with an operating body such as a finger.

The decision key 11 detects a pressing operation and outputs a signal for deciding content operated with the control device 10. The lighting unit 12 notifies of an operation state of the HMD 100 in accordance with light emission states. Examples of the operation states of the HMD 100 include ON and OFF of power. As the lighting unit 12, for example, a light-emitting diode (LED) is used. The display switch key 13 detects a pressing operation and outputs, for example, a signal for switching a display mode of a content moving image between 3D and 2D.

The track pad 14 detects an operation on an operation surface of the track pad 14 by a finger of the user and outputs a signal according to the detection content. Any of various track pads of an electrostatic detection type, a pressure detection type, and an optical type can be adopted as the track pad 14. In a case in which the track pad 14 is of a pressure detection type or an optical type, any of various kinds of operating bodies such as a finger of the user, a pen, a pen type decided indicator can be used as an operating body operating the track pad 14. In a case in which the track pad 14 is of an electrostatic detection type, a part of the body such as a finger, an electrostatic stylus pen, or the like can be used as the operating body. The user can also perform an operation with his or her body other than a hand as an operating body. For example, the track pad 14 may be configured such that the user can performs an operation of touching the track pad 14 with a leg, an elbow, a shoulder, a waist, or the like. In this case, a position at which a leg, an elbow, a shoulder, a waist, or the like of the user is touched on the track pad 14 is detected as an operation position. When the touch position is moved, movement of the operation position is detected. This configuration can be implemented by disposing the track pad 14 at a position at which the user can easily touch the track pad 14 with his or leg, elbow, waist, or the like. The size of the track pad 14 may be a suitable size with which the user touches the track pad 14 with his or leg, elbow, shoulder, waist, or the like. A sheet-shaped or plate-shaped device including the track pad 14 may be provided separated from the control device 10 and the control device 10 may be configured to be connected to this device.

The luminance switch key 15 detects a pressing operation and outputs a signal for increasing or decreasing the luminance of the image display unit 20. The direction key 16 detects a pressing operation on a key corresponding to any of the upper, lower, right, and left directions and outputs a signal according to the detection content. The power switch 18 is a switch that switches a power feeding state to the HMD 100 and is configured such that, for example, a slide operation is possible.

Figure 2:
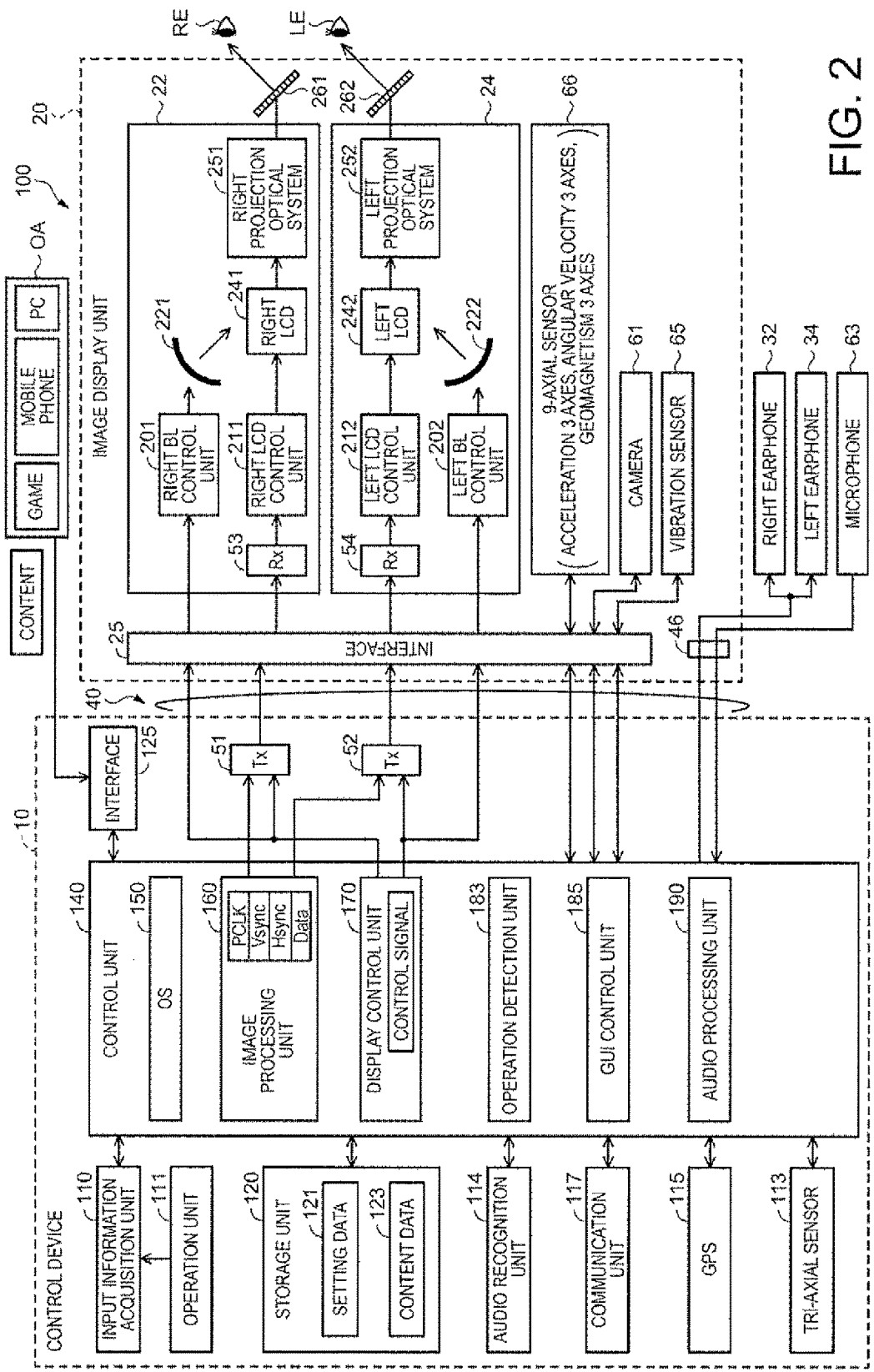
FIG. 2 is a functional block diagram illustrating units included in the HMD according to the first embodiment.

FIG. 2 is a functional block diagram illustrating units included in the HMD 100.

As illustrated in FIG. 2, the HMD 100 is connected to an external apparatus OA via an interface 125. The interface 125 is an interface that connects any of various external apparatuses OA serving as a content supply source to the control device 10. For example, an interface corresponding to wired connection, such as a USB interface, a micro USB interface, or a memory card interface, can be used as the interface 125.

The external apparatus OA is used as an image supply apparatus that supplies an image to the HMD 100. For example, a personal computer (PC), a mobile phone terminal, or a game terminal is used.

The control device 10 of the HMD 100 includes a control unit 140, an operation unit 111, an input information acquisition unit 110 (operation detection unit), a storage unit 120, a transmission unit (Tx) 51, and a transmission unit (Tx) 52.

The operation unit 111 detects an operation by the user. The operation unit 111 includes operators of the decision key 11, the display switch key 13, the track pad 14, the luminance switch key 15, the direction key 16, the menu key 17, and the power switch 18 illustrated in FIG. 1.

The input information acquisition unit 110 detects an operation of each operator of the operation unit 111 and outputs operation data indicating operation content to the control unit 140. Specifically, the operation data includes data for specifying an operated operator and data indicating classification of an operation of the operator. For example, a case in which the decision key 11, the display switch key 13, the luminance switch key 15, the menu key 17, and the power switch 18 is assumed to operate. In this case, the input information acquisition unit 110 outputs operation data including data indicating an operated key or switch and data indicating that an operation is "performed" to the control unit 140. For example, the direction key 16 can be operated in four directions. Therefore, when the input information acquisition unit 110 detects an operation of the direction key 16, the input information acquisition unit 110 outputs data indicating the direction key 16 and data indicating an operation direction to the control unit 140.

In a case in which the input information acquisition unit 110 detects an operation on the track pad 14, the input information acquisition unit 110 detects a position (operation position) at which a touch is operated on the track pad 14. The input information acquisition unit 110 outputs operation data including data indicating an operation position and data indicating that the operated operator is the track pad 14 to the control unit 140. The operation data includes, for example, data indicating an operation position as a relative position to an operation area of the track pad 14. Any type of operation data can be used.

The storage unit 120 is a nonvolatile storage device and stores various computer programs. The storage unit 120 may store image data to be displayed on the image display unit 20 of the HMD 100. For example, the storage unit 120 stores setting data 121 including setting values related to an operation of the HMD 100 and content data 123 including data of text or an image to be displayed on the image display unit 20 by the control unit 140.

A tri-axial sensor 113, a GPS 115, a communication unit 117, and an audio recognition unit 114 are connected to the control unit 140. The tri-axial sensor 113 (posture detection unit) is an acceleration sensor of three axes. A detection value of the tri-axial sensor 113 can be acquired by the control unit 140. The GPS 115 includes an antenna (not illustrated), receives a Global Positioning System (GPS) signal, and obtains a current position of the control device 10. The GPS 115 outputs a current time or a current position obtained based on the GPS signal to the control unit 140. The GPS 115 may have a function of acquiring a current time based on information included in the GPS signal and correcting a time clocked by the control unit 140 of the control device 10.

The communication unit 117 performs wireless data communication in conformity to a wireless communication standard such as a wireless LAN (WiFi (registered trademark)) or a Miracast (registered trademark). The communication unit 117 can also perform wireless data communication in conformity to a short-range wireless communication standard such as Bluetooth (registered trademark), Bluetooth Low Energy, RFID, or Felica (registered trademark).

In a case in which the external apparatus OA is wirelessly connected to the communication unit 117, the control unit 140 acquires content data from the communication unit 117 and performs control such that an image is displayed on the image display unit 20. In contrast, in a case in which the external apparatus OA is connected to the interface 125 in a wired manner, the control unit 140 acquires content data from the interface 125 and performs control such that an image is displayed on the image display unit 20. Accordingly, the communication unit 117 and the interface 125 are collectively referred to as a data acquisition unit DA below.

The data acquisition unit DA acquires content data from the external apparatus OA. The data acquisition unit DA acquires data of an image to be displayed by the HMD 100 from the external apparatus OA.

The audio recognition unit 114 extracts and models characteristics from digital audio data obtained by collecting an audio by the microphone 63 and converting the audio into digital data by the audio processing unit 190 to be described below. The audio recognition unit 114 separately recognizes audios of a plurality of people by extracting and modeling the characteristics of the audios and performs speaker recognition to specify a speaking person for each audio or text conversion to convert an audio into text. The audio recognition unit 114 may be configured to identify a kind of language of audio data in the audio recognition process.

The control unit 140 includes a CPU, a ROM, a RAM (none of which is illustrated) as hardware. The control unit 140 performs the functions of the units including an operating system (OS) 150 by reading and executing computer programs stored in the storage unit 120. Specifically, the control unit 140 functions as an image processing unit 160, a display control unit 170, an operation detection unit 183, a GUI control unit 185, and an audio processing unit 190.

The image processing unit 160 outputs image data (Data in the drawing) of an image to be displayed, such as a vertical synchronization signal VSync, a horizontal synchronization signal HSync, a clock signal PCLK, and the like for displaying content.

The image data of the content to be displayed through a process of the image processing unit 160 may be image data received via the interface 125 or the communication unit 117 or generated through a process of the control unit 140. For example, image data may be generated and displayed in response to an operation of the operation unit 111 while a game application program is executed.

The image processing unit 160 may perform on the image data, such as various tone correction processes such as a resolution conversion process and luminance or saturation adjustment and image processing such as a keystone correction process, as necessary.

The image processing unit 160 transmits each of the generated clock signal PCLK, vertical synchronization signal VSync, and horizontal synchronization signal HSync and the image data Data stored in a DRAM inside the storage unit 120 via the transmission units 51 and 52. The image data Data transmitted via the transmission unit 51 is also referred to as "right-eye image data" and the image data Data transmitted via the transmission unit 52 is also referred to as "left-eye image data". The transmission units 51 and 52 functions a transceiver for serial transmission between the control device 10 and the image display unit 20.

The display control unit 170 generates control signals to control the right display driving unit 22 and the left display driving unit 24. Specifically, according to the control signals, the display control unit 170 separately controls driving ON/OFF of a right LCD 241 by a right LCD control unit 211 and driving ON/OFF of a right backlight 221 by a right backlight control unit 201. The display control unit 170 separately controls driving ON/OFF of a left LCD 242 by a left LCD control unit 212 and driving ON/OFF of a left backlight 222 by a left backlight control unit 202.

Accordingly, the display control unit 170 controls generation and emission of image light by each of the right display driving unit 22 and the left display driving unit 24. For example, the display control unit 170 causes both or only one of the right display driving unit 22 and the left display driving unit 24 to generate image light. The display control unit 170 may cause neither of the right display driving unit 22 and the left display driving unit 24 to generate image light.

The display control unit 170 transmits each of the control signal for the right LCD control unit 211 and the control signal for the left LCD control unit 212 via the transmission units 51 and 52. The display control unit 170 transmits the control signal for the right backlight control unit 201 to the right backlight control unit 201 and transmits the control signal for the left backlight control unit 202 to the left backlight control unit 202.

The display control unit 170 causes the image display unit 20 to display AR content. The AR content includes text or an image to be displayed in correspondence to a position at which a target is viewed in a state in which the user views the target over the image display unit 20. For example, the AR content is displayed so that the AR content overlaps a target in an outside scenery transmitted and viewed through the image display unit 20, that is, a target present in the real space, or to evade the target. The display control unit 170 supplies information regarding the target by performing AR display to display an image, text, or the like at a position corresponding to the target or changes a method of viewing the target over the image display unit 20.

The AR content may be displayed at a position at which the AR content overlaps the target or around the target. The target is an object or may be an unmovable thing such as a wall surface of a building, or a natural object.

The AR content is displayed based on content data 123 stored in the storage unit 120 or data generated through a process of the control unit 140. Such data can include image data or text data.

The display control unit 170 detects a position at which the user views an object and decides a display position of the AR content to correspond to the detected position. Any method of detecting the position at which the user views the object can be used. In the embodiment, the display control unit 170 detects an object located in the view field of the user from captured image data of the camera 61. In a process of analyzing the captured image data and extracting or detecting an image of an object, data of a characteristic amount regarding the shape, color, size, or the like of the image of the object is used. Such data can be included in the content data 123. The display control unit 170 detects the image of the object from the captured image data of the camera 61 and specifies the position of the object in an image range of the camera 61 based on a positional relation between the detected image of the object and the entire captured image. Then, the display control unit 170 decides the display position of the AR content corresponding to the position of the object based on a positional relation between the imaging range of the camera 61 and the display region of the image display unit 20.

The audio processing unit 190 acquires audio signals included in the content, amplifies the acquired audio signals, and supplies the amplified audio signals to a speaker (not illustrated) inside the right earphone 32 connected to the connection member 46 and a speaker (not illustrated) inside the left earphone 34. For example, in a case in which a Dolby (registered trademark) system is adopted, a process is performed on the audio signals, and thus different audios with, for example, changed frequencies are output from the right earphone 32 and the left earphone 34.

The image display unit 20 includes the interface 25, the right display driving unit 22, the left display driving unit 24, a right light-guiding plate 261 serving as the right optical image display unit 26, a left light-guiding plate 262 serving as the left optical image display unit 28, the camera 61, a vibration sensor 65, and a 9-axial sensor 66.

The vibration sensor 65 is configured of an acceleration sensor and is disposed inside the image display unit 20. For example, the vibration sensor 65 is built near the end portion ER of the right optical image display unit 26 in the right holding unit 21. In a case in which the user performs a operation of knocking the end portion ER (knocking operation), the vibration sensor 65 detects vibration generated by this operation and outputs a detection result to the control unit 140. According to the detection result of the vibration sensor 65, the control unit 140 detects a knocking operation by the user.

The 9-axial sensor 66 is a motion sensor that detects acceleration (3 axes), angular velocities (3 axes), and geomagnetism (3 axes). The 9-axial sensor 66 is provided in the image display unit 20. Therefore, when the image display unit 20 is mounted on the head of the user, the control unit 140 can detect a motion of the head of the user based on detection values of the 9-axial sensor 66. Since the direction of the image display unit 20 can be known from the detected motion of the head of the user, the control unit 140 can estimate a visual line direction of the user.

The interface 25 includes a connector to which the right cord 42 and the left cord 44 are connected. The interface 25 outputs the clock signal PCLK, the vertical synchronization signal VSync, the horizontal synchronization signal HSync, and the image data Data transmitted from the transmission unit 51 to corresponding reception units (Rx) 53 and 54. The interface 25 outputs the control signals transmitted from the display control unit 170 to the corresponding reception units 53 and 54, and the right backlight control unit 201 or the left backlight control unit 202.

The interface 25 is an interface of the camera 61, the vibration sensor 65, and the 9-axial sensor 66. A detection result of vibration by the vibration sensor 65 or detection results of acceleration (3 axes), angular velocities (3 axes), and geomagnetism (3 axes) by the 9-axial sensor 66 are transmitted to the control unit 140 of the control device 10 via the interface 25.

The right display driving unit 22 includes the reception unit 53, the right backlight (BL) control unit 201 and the right backlight (BL) 221 functioning as a light source, the right LCD control unit 211 and the right LCD 241 functioning as a display element, and a right projection optical system 251. The right backlight control unit 201 and the right backlight 221 function as a light source. The right LCD control unit 211 and the right LCD 241 function as a display element. The right backlight control unit 201, the right LCD control unit 211, the right backlight 221, and the right LCD 241 are also collectively referred to as an "image light generation unit".

The reception unit 53 functions as a receiver for serial transmission between the control device 10 and the image display unit 20. The right backlight control unit 201 drives the right backlight 221 based on the input control signal. The right backlight 221 is, for example, an illuminant such as an LED or an electroluminescence (EL). The right LCD control unit 211 drives the right LCD 241 based on the clock signal PCLK, the vertical synchronization signal VSync, the horizontal synchronization signal HSync, and the right-eye image data Data input via the reception unit 53. The right LCD 241 is a transmissive liquid crystal panel in which a plurality of pixels are arrayed in a matrix form.

The right projection optical system 251 is configured of a collimating lens that forms the image light emitted from the right LCD 241 as a light flux in a parallel state. The right light-guiding plate 261 serving as the right optical image display unit 26 guides the image light output from the right projection optical system 251 to a right eye RE of the user while reflecting the image light along a predetermined optical path.

The left display driving unit 24 has the same configuration as the right display driving unit 22. The left display driving unit 24 includes the reception unit 54, the left backlight (BL) control unit 202 and the left backlight (BL) 222 functioning as a light source, the left LCD control unit 212 and the left LCD 242 functioning as a display element, and a left projection optical system 252. The left backlight control unit 202 and the left backlight 222 function as a light source. The left LCD control unit 212 and the left LCD 242 function as a display element. The left projection optical system 252 is configured of a collimating lens that forms the image light emitted from the left LCD 242 as a light flux in a parallel state. The left light-guiding plate 262 serving as the left optical image display unit 28 guides the image light output from the left projection optical system 252 to a left eye LE of the user while reflecting the image light along a predetermined optical path.

The control unit 140 can cause the image display unit 20 to display a graphical user interface (GUI) in addition to the AR content, The GUI control unit 185 controls display of a GUI by the image display unit 20 to display a GUI object including a marker which is an index for a GUI operation (an index of an operation position of a GUI operation), a pointer (including a so-called mouse pointer), an image such as an icon, and text. The GUI object corresponds to a display object according to the invention.

The GUI control unit 185 updates a display state of the GUI object in response to an operation of the operation unit 111. In the embodiment, the GUI control unit 185 displays a pointer in correspondence to an operation position operated on the track pad 14. The display position of the pointer in the display region of the image display unit 20 and the operation position on the track pad 14 are associated with each other in advance. When the coordinates of the operation position on the track pad 14 are input from the operation detection unit 183, the GUI control unit 185 displays a pointer at the display position corresponding to the input operation position or changes the display position of the pointer during display.

The operation detection unit 183 detects an operation performed on each operator of the operation unit 111 based on operation data input from the input information acquisition unit 110 and decides a process to be performed by the control unit 140 in response to the operation.

The operation detection unit 183 analyzes the operation data and selects a process corresponding to such an operation in a case in which the operated operator is the decision key 11, the display switch key 13, the luminance switch key 15, the menu key 17, or the power switch 18. In regard to the operation of the decision key 11, a process of deciding a menu screen or the like displayed through control of the GUI control unit 185 is selected. In a case in which the display switch key 13 is operated, a process of switching a screen to be displayed is selected. For example, the operation detection unit 183 selects a process of sequentially switching a plurality of display states including a state in which a screen is displayed through control of the GUI control unit 185 and a state in which the content data 123 is displayed. In a case in which the luminance switch key 15 is operated, a process of adjusting display luminance on the image display unit 20 is selected. Specifically, a process is selected in which the display control unit 170 controls the image processing unit 160 such that the luminance of the image data to be output to the right display driving unit 22 and the left display driving unit 24 is changed. Alternatively, a process is selected in which the display control unit 170 changes the luminance of the right backlight control unit 201 and the left backlight control unit 202.

In a case in which the direction key 16 is operated, the operation detection unit 183 selects a process or the like on the menu screen or the like to be displayed through control of the GUI control unit 185 in correspondence to an operation direction of the direction key 16. In a case in which the power switch 18 is operated, the operation detection unit 183 selects a shutdown process of turning off power of the HMD 100 or an activation sequence of turning on the power of the HMD 100.

In a case in which the track pad 14 is operated, the operation detection unit 183 acquires the coordinates for the GUI control unit 185 to perform a display process in correspondence to the coordinates of the operation position on the track pad 14.

In the embodiment, the GUI control unit 185 displays a display object in correspondence to the operation position on the track pad 14. The GUI control unit 185 changes the display position of the display object in response to the operation on the track pad 14. Accordingly, when the user (operator) operating the control device 10 performs an operation of touching the track pad 14 (touch operation), the display position of the display object displayed on the image display unit 20 is moved.

Figure 3:
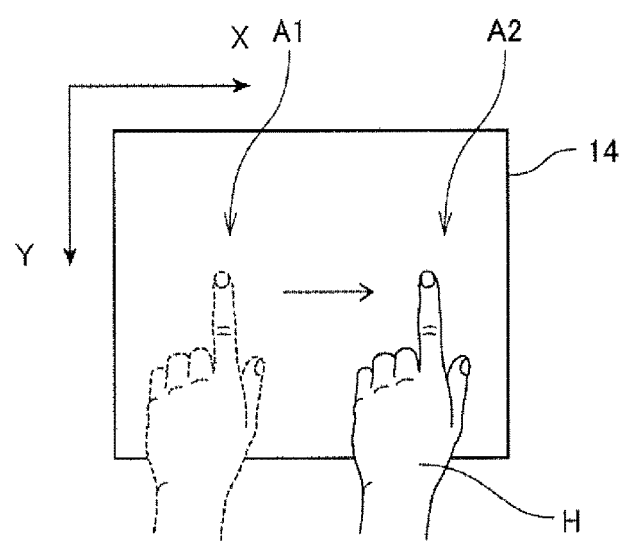
FIG. 3 is a diagram illustrating an operation of the HMD corresponding to an operation on a track pad and illustrating an example of an operation on the track pad.

FIG. 3 is a diagram illustrating an operation of the HMD 100 corresponding to an operation on the track pad 14 and illustrating an example of an operation on the track pad 14.

As the operation on the track pad 14, for example, as illustrated in FIG. 3, there is an operation of moving a finger or the like with the finger or the like touched on the track pad 14. The operation exemplified in FIG. 3 is an operation of touching a hand H of the user on the track pad 14 at an operation position A1 and moving the hand H from the operation position A1 to an operation position A2 with the touch state maintained. In this example, the hand H is used as an operating body. As indicated by signs X and Y in FIG. 3, in the embodiment, X-Y rectangular coordinates in which the top left corner of the track pad 14 serve as a reference position (for example, the origin) is set. When a touch of the hand H on the track pad 14 is detected, the input information acquisition unit 110 generates and outputs operation data indicating an operation position which is a position at which the hand H touches the track pad 14. The operation detection unit 183 acquires or specifies the X and Y coordinates of the operation position based on the operation data input from the operation unit 111.

Here, the operation data generated and output by the input information acquisition unit 110 may include the X and Y coordinates of the operation position. The input information acquisition unit 110 may be configured to generate and output an analog detection value or digital data for specifying the operation position on the track pad 14. In this case, the operation detection unit 183 performs a process of obtaining the X and Y coordinates of the operation position based on the analog detection value or the digital data output by the input information acquisition unit 110.

The operation detection unit 183 generates input data based on the coordinates of the operation position. The input data is data obtained by converting the position input in the operation on the track pad 14 into a position on an input plane which the operating system 150 has.

In the embodiment, the operating system 150 sets a virtual input plane to receive a two-dimensional position inputting operation. The operation detection unit 183 generates input data indicating a position on the input plane of the operating system 150 (hereinafter referred to as an input position) based on the operation data output by the input information acquisition unit 110. The virtual input plane is assumed to a virtual input plane IP in the following description. The operation detection unit 183 outputs input data indicating an input position on the virtual input plane IP to the GUI control unit 185. The virtual input plane IP is not limited to the plane regulated in the operating system 150. For example, a configuration is considered in which a coordinate system is defined in correspondence to an application program executed on the operating system 150 or a program language describing the application program. In this case, the virtual input plane IP corresponding to the defined coordinate system can be set, and thus the invention can also applied to a configuration in which input data corresponding to the virtual input plane IP is generated by the control unit 140 and is output.

The virtual input plane IP can be used without being limited to the case in which a two-dimensional position input is received. For example, a configuration is considered in which the control device 10 including the operating system 150 receives a three-dimensional position input. In this configuration, the control device 10 may be configured to be able to detect a two-dimensional position input inside the virtual input plane IP and a position input in which a direction perpendicular to the virtual input plane IP is used a coordinate axis using the virtual input plane IP as a reference. In this case, the control device 10 can receive a three-dimensional position input using the virtual input plane IP as the reference and performs a process.

A motion of an operating body (for example, the hand H) in a case in which the track pad 14 is operated is referred to as a gesture. As the gesture, for example, there are a motion of touching the track pad 14, a motion of moving the operating body with the operating body touched on the track pad 14 as in FIG. 3, and a motion of knocking (tapping) the track pad 14. In the embodiment, the motion of moving the operating body with the operating body touched on the track pad 14 as in FIG. 3 is referred to as a slide gesture.

In a case in which the track pad 14 is a multi-touch correspondence type track pad capable of detecting simultaneous operations on a plurality of positions, a gesture of touching a plurality of operating bodies on the track pad 14 and moving touch positions of the plurality of operating bodies can be performed.

Figure 4:
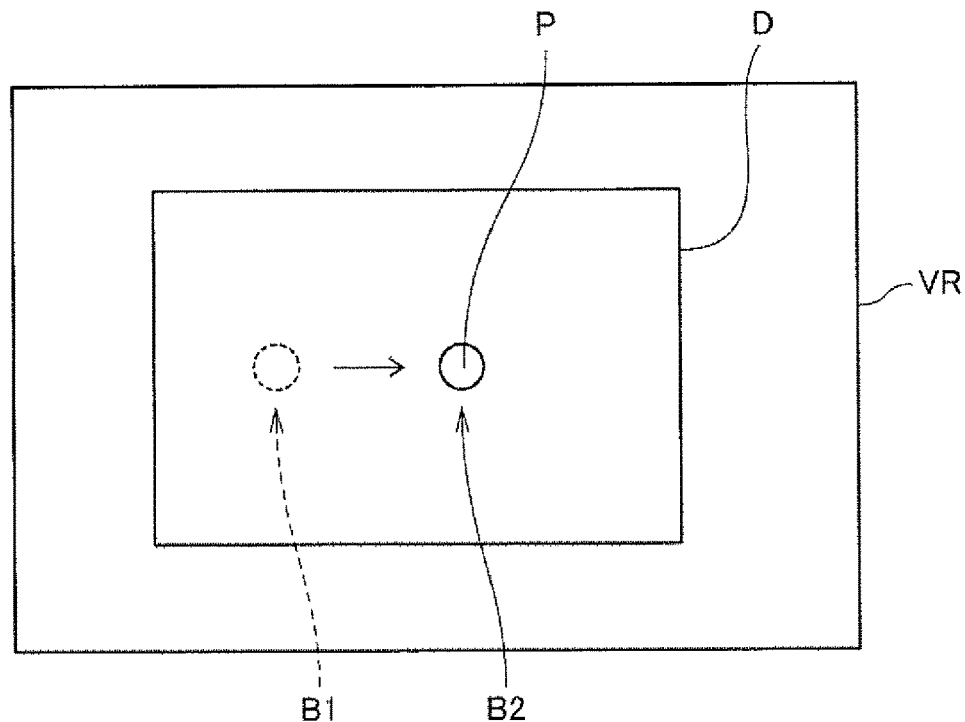
FIG. 4 is a diagram illustrating an example of movement of a pointer corresponding to an operation on the track pad.
Figure 5:
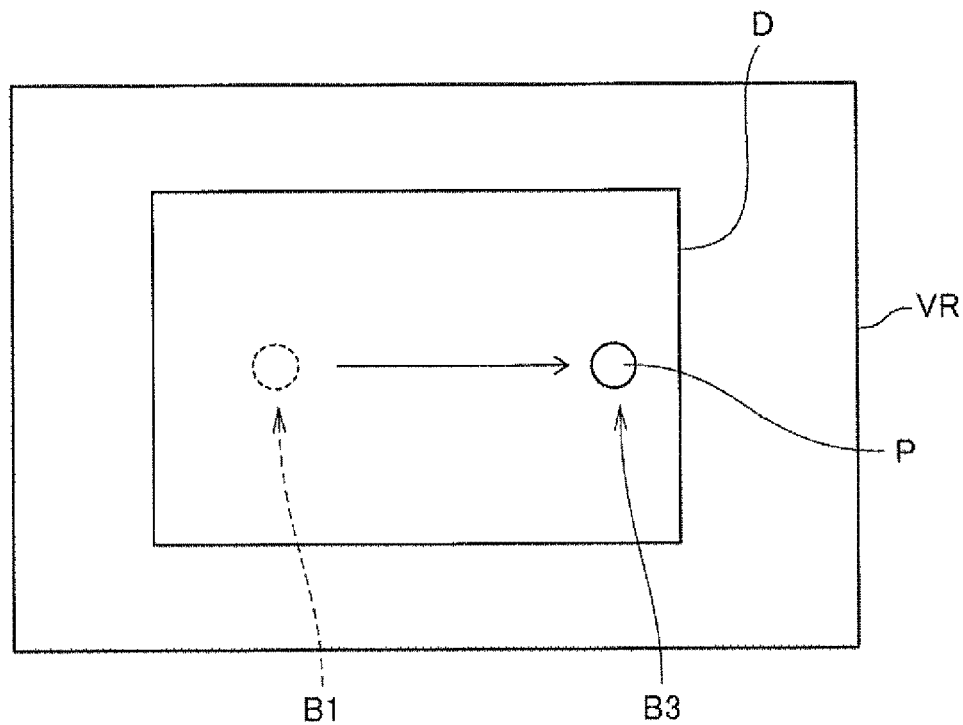
FIG. 5 is a diagram illustrating another example of movement of a pointer corresponding to an operation on the track pad.

FIG. 4 is a diagram illustrating an example of movement of a pointer P corresponding to an operation on the track pad 14. FIG. 5 is a diagram illustrating an example of movement of a pointer P corresponding to an operation on the track pad 14.

The GUI control unit 185 displays the pointer P in correspondence to a position specified by the input data generated by the operation detection unit 183, as illustrated in FIG. 4. In FIG. 4, a view field VR of the user wearing the image display unit 20 is illustrated an a displayable region in which an image can be displayed by the right display driving unit 22 or the left display driving unit 24 is indicated by a sign D. In the embodiment, since both of the right display driving unit 22 and the left display driving unit 24 of the image display unit 20 perform the same display, the right display driving unit 22 and the left display driving unit 24 are not distinguished from each other in FIG. 4. The same applies to FIGS. 5, 6, and 8.

The GUI control unit 185 controls the display control unit 170 and the image processing unit 160 such that the pointer P is displayed in the displayable region D. The pointer P is an index which is displayed for an operation of a GUI and indicates an operation target position in the display region. The pointer P is an example of the display object. The shape of the pointer P may not be circular, but may be a geometric form such as a rectangle or a triangle, a sign, an arrow, or the like. The shape and the size of the pointer P are not limited.

In the example of FIG. 3, the input information acquisition unit 110 detects an operation position on the track pad 14 at a preset sampling period while the position of the hand H is moved from the operation position A1 to the operation position A2. Accordingly, the input information acquisition unit 110 outputs operation data indicating an operation position on the track pad 14 according to the sampling period. For example, whenever the input information acquisition unit 110 outputs the operation data, the operation detection unit 183 generates input data corresponding to the operation data and outputs the input data to the GUI control unit 185. The GUI control unit 185 obtains the display position of the pointer P corresponding to the input position indicated by the input data and displays the pointer P at the obtained display position. As a result, as illustrated in FIG. 4, the GUI control unit 185 moves the pointer P from a display position B1 corresponding the operation position A2 to a display position B2 corresponding to the operation position A2 in response to an operation of moving the hand H from the operation position A1 to the operation position A2 in FIG. 3. In the example of FIG. 4, the GUI control unit 185 repeatedly performs the process of displaying the pointer P at a plurality of positions between the display positions B1 and B2.

In a normal process for an input operation, the coordinates of an operation position on the track pad 14, the coordinates of an input position on the virtual input plane IP, and the coordinates of a display position in the displayable region D can be associated in advance. The GUI control unit 185 obtains a display position corresponding to the coordinates in the displayable region D in the right LCD 241 and the left LCD 242 and displays an image of the pointer P at the display position. Accordingly, the display position of the pointer P is moved in response to the operation.

As described with reference to FIG. 1, since the control device 10 is a device carried by the user and it is not easy to increase the size of the track pad 14, the track pad 14 is small in proportion to the size of the displayable region D viewed in the view field VR by the user.

Accordingly, in the embodiment, the correspondence between the operation position on the track pad 14 and the display position of the displayable region D is changed through a process of the operation detection unit 183.

In the normal process for the input operation, the operation detection unit 183 generates input data indicating the input position corresponding to the operation position actually detected on the track pad 14 and delivers the input data to the GUI control unit 185. Therefore, the GUI control unit 185 displays the pointer P from the display position B1 to the display position B2 in FIG. 4 in response to an operation from the operation position A1 to the operation position A2 illustrated in FIG. 3.

The operation detection unit 183 can perform another input process other than the normal process in response to a slide gesture. In the input process, the operation detection unit 183 generates input data indicating the input position corresponding to coordinates included in the operation data and also generates input data indicating the input position not corresponding to the coordinates included in the operation data. Specifically, the operation detection unit 183 generates the input data so that the input position is moved on the virtual input plane IP in a state in which the operation position on the track pad 14 is not moved, and then outputs the input data to the GUI control unit 185. In this case, the operation detection unit 183 continuously generates the input data a plurality of time and sets the input position in each piece of input data as a different position. In this case, a position at which the GUI control unit 185 displays the pointer P is moved in accordance with the input position on the virtual input plane IP. The operation of the GUI control unit 185 is the same not only in the normal process but also in another input process.

In this case, as illustrated in FIG. 5, the GUI control unit 185 moves the display position of the pointer P from the display position B1 to the display position 133 in response to an operation of moving the hand H from the operation position A1 to the operation position A2 illustrated in FIG. 3. A distance between the display positions B1 to B3 is longer than a distance between the display positions B1 and B2 illustrated in FIG. 4. That is, in the normal process, a movement amount of the display position of the pointer P corresponds to a movement amount of the hand H on the track pad 14, but the HMD 100 can move the pointer P by an amount greater than the movement amount of the hand H on the track pad 14.

Figure 6:
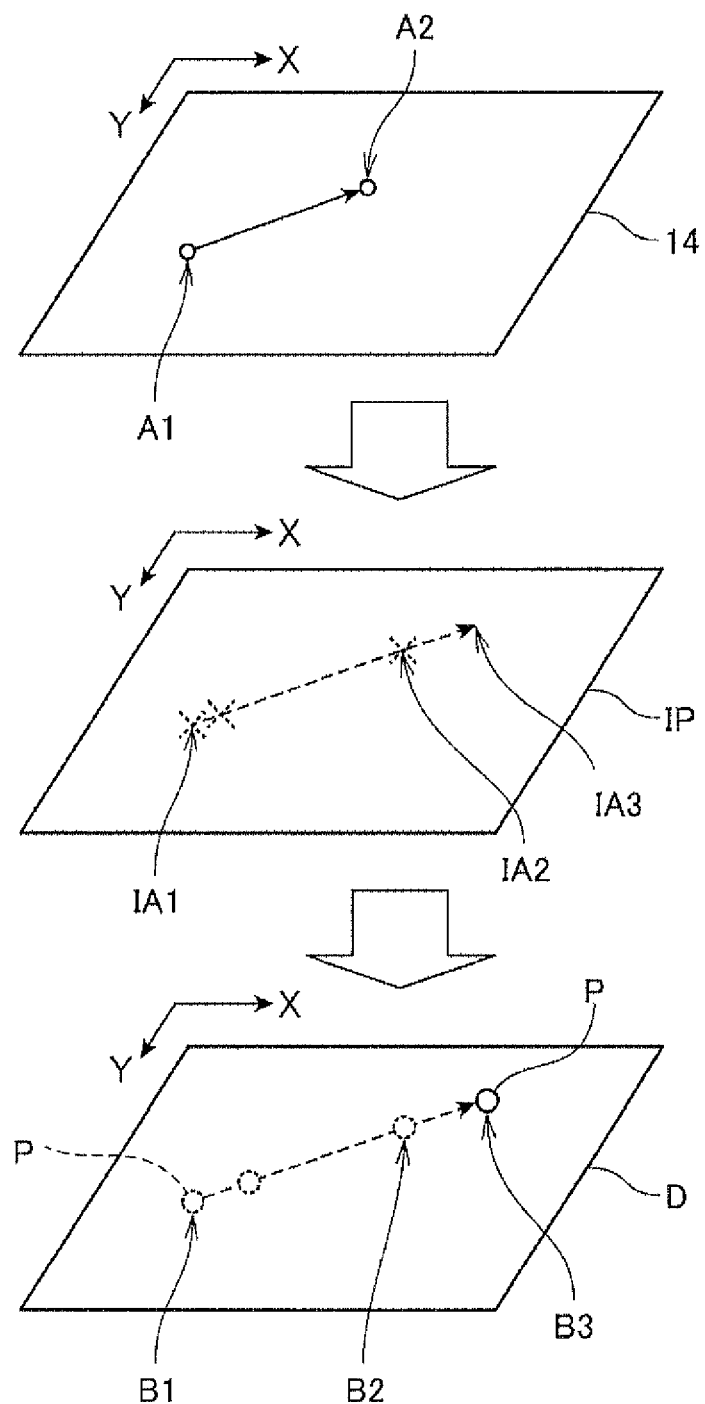
FIG. 6 is a schematic diagram illustrating correspondence among the track pad, a virtual input plane, and a displayable region.

FIG. 6 is a schematic diagram illustrating correspondence among the track pad 14, the virtual input plane IP, and the displayable region D.

In the embodiment, the virtual input plane IP set virtually by the operating system 150 is defined as a plane parallel to the track pad 14. Therefore, the rectangular coordinates formed by the X and Y axes on the track pad 14 and the rectangular coordinate system formed by the X and Y axes on the virtual input plane IP can be superimposed. The displayable region D is defined as a plane parallel to the virtual input plane IP. Therefore, the rectangular coordinate system formed by the X and Y axes on the virtual input plane IP and the rectangular coordinates formed by the X and Y axes in the displayable region D can be superimposed.

The sizes of the track pad 14, the virtual input plane IP, and the displayable region D may be different. The resolution of the coordinates of the operation position A on the track pad 14, the resolution of the coordinates of input coordinates IA on the virtual input plane IP, and the resolution of the display position B in the displayable region D may be different.

In this configuration, the operation detection unit 183 can convert the coordinates of the operation position on the track pad 14 into the coordinates of the input position on the virtual input plane IP by a calculation formula, a function, a matrix, or the like. Similarly, the GUI control unit 185 can convert the coordinates of the input position on the virtual input plane IP into the coordinates of the display position in the displayable region D. A calculation formula, a function, a matrix, a parameter, or the like necessary for the conversion is stored in a format included in, for example, the setting data 121 in advance in the storage unit 120.

As described above, in a case in which the hand H is moved from the operation position A1 to the operation position A2 on the track pad 14, the operation detection unit 183 generates input data for moving the input position from an input position IA1 corresponding to the operation position A1 to an input position IA2 corresponding to the operation position A2. In this case, the GUI control unit 185 displays the pointer P at the display position B1 corresponding to the input position IA1 and moves the display position of the pointer P up to the display position B2 corresponding to the input position IA2. Here, the operation detection unit 183 can generate input data for moving the display position from the input position IA2 to an input position IA3 while the hand H stops at the operation position A2. In practice, the operation detection unit 183 sets the input position IA1 corresponding to the operation position A1 as an initial position, decides a movement direction and a movement amount of the input position from the initial position, and continuously generates the input data to correspond to the decided movement direction and movement amount. Here, the operation detection unit 183 may first calculate the coordinates of the input position IA3 which is an end position of the movement of the input position after deciding the movement direction and the movement amount of the input position. In this case, the GUI control unit 185 moves the display position of the pointer P from the display position B1 to the display position B3 corresponding to the input position IA3.

The operation detection unit 183 analyzes the operation data input from the input information acquisition unit 110 and decides the movement direction of the input position based on the movement direction of the operation position on the track pad 14. The operation detection unit 183 decides the movement amount of the input position based on at least one of the movement amount of the operation position on the track pad 14, the movement speed, and an operation time of the track pad 14.

For example, the operation detection unit 183 may obtain the movement amount of the input position after the operation position on the track pad 14 is stopped and the movement amount of the operation position is confirmed. In this case, the operation detection unit 183 may maintain the initial position as the input position and generate the input data until the operation position on the track pad 14 is stopped. Alternatively, the operation detection unit 183 may obtain the input position corresponding to the operation position on the track pad 14 according to a sampling period of the input information acquisition unit 110 and generate the input data.

For example, the operation detection unit 183 may obtain the movement amount of the input position based on a time in which a touch on the track pad 14 by the hand H is detected and releasing of the touch is detected. In this case, the operation detection unit 183 may maintain the initial position as the input position and generates the input data until the touch on the track pad 14 is released. Alternatively, the operation detection unit 183 may obtain the input position corresponding to the operation position on the track pad 14 according to a sampling period of the input information acquisition unit 110 and generate the input data.

For example, the operation detection unit 183 may obtain the movement speed of the operation position within a predetermined time after the input information acquisition unit 110 detects an operation on the track pad 14, and may obtain the movement amount of the input position corresponding to the obtained movement speed. The predetermined time is preset, is included in, for example, the setting data 121, and is stored in the storage unit 120. In this case, the operation detection unit 183 may maintain the input position corresponding to the initial position of the operation position on the track pad 14 within the predetermined time and generate the input data. Alternatively, the operation detection unit 183 may obtain the input position corresponding to the operation position on the track pad 14 according to a sampling period of the input information acquisition unit 110 and generate the input data.

For example, the operation detection unit 183 may obtain the movement direction of the operation position within a predetermined time after the input information acquisition unit 110 detects an operation on the track pad 14, and may set the movement direction of the input position corresponding to the obtained movement direction. The predetermined time is preset, is included in, for example, the setting data 121, and is stored in the storage unit 120.

In this case, the operation detection unit 183 may generate the input data without limiting to the movement amount of the input position so that the input position is moved at a preset movement speed or a movement speed of the input position corresponding to the movement speed of the operation position. In this case, the operation detection unit 183 continuously generate and output the input data by which the input position is moved in the set movement direction and the set movement speed until the touch on the track pad 14 is released. A period at which the input data is generated and output may be a preset period or may be decided according to a sampling period of the input information acquisition unit 110. The operation detection unit 183 stops generating and outputting the input data at a timing at which the input information acquisition unit 110 detects the releasing of the touch on the track pad 14.

In any case, the operation detection unit 183 continuously performs the process of generating the input data until the hand H which is an operating body is away from the track pad 14. Therefore, the GUI control unit 185 continuously moves the display position of the pointer P in the displayable region D.

When the user intends to perform a slide gesture, the pointer P can be moved by an amount greater than the actual movement amount of the operating body. By detaching the operating body from the track pad 14, it is possible to stop the pointer P, and thus it is possible to control the stop position of the pointer P with high precision.

Figure 7:
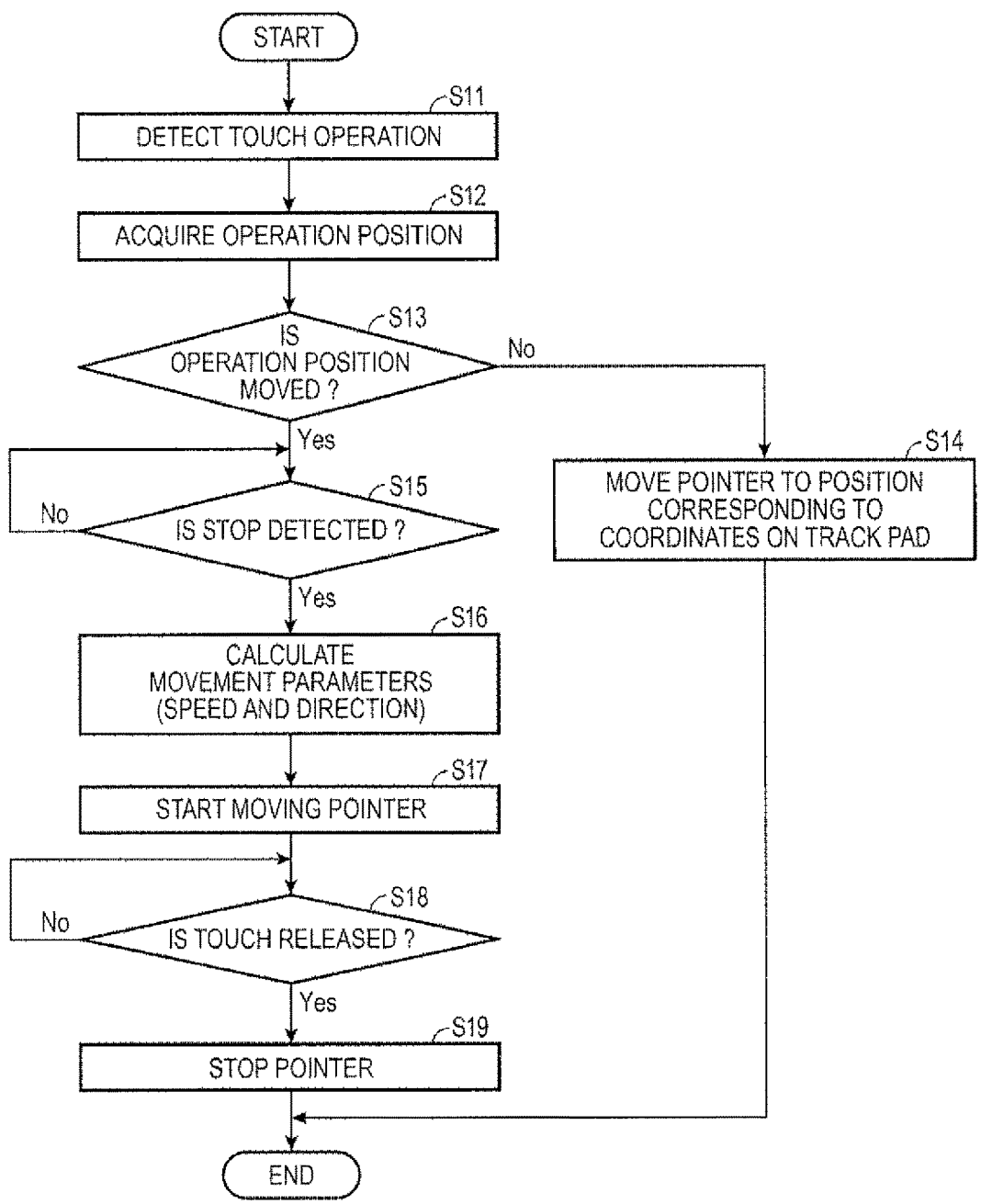
FIG. 7 is a flowchart illustrating an operation of the HMD according to the first embodiment.

FIG. 7 is a flowchart illustrating an operation of the HMD 100 and illustrating an operation of controlling the display position of the pointer P in response to an operation on the track pad 14.

When a touch operation on the track pad 14 is detected based on the operation data input from the input information acquisition unit 110 (step S11), the control unit 140 acquires the coordinates of the operation position (step S12). The control unit 140 determines whether the operation position is moved, that is, the operation corresponds a slide gesture (step S13). For example, in a case in which the coordinates of the operation position is changed by a threshold value or more within a preset time, the touch operation can be determined to be the slide gesture and a determination condition of the slide gesture can be included in the setting data 121 to be stored.

In a case in which the control unit 140 determines that the operation is not the slide gesture (No in step S13), the control unit 140 displays the pointer P in correspondence to the operation position on the track pad 14 (step S14). In step S14, the control unit 140 generates the input data corresponding to the operation position, and displays the pointer P at a position indicated by the input data or moves the display position of the pointer P. After the process of step S14, the control unit 140 ends the present process. After the process end, the control unit 140 waits for a touch operation on the track pad 14.

In a case in which the control unit 140 determines that the operation on the track pad 14 is the slide gesture (Yes in step S13), the control unit 140 waits until the operation position is stopped (step S15). During the waiting, the control unit 140 continuously detects the operation position based on the operation data input from the input information acquisition unit 110.

In a case in which the operation position is stopped (Yes in step S15), the control unit 140 calculates movement parameters of the input data to generate the input data corresponding to the slide gesture (step S16). The movement parameters of the input data include, for example, data indicating a starting position of the movement of the input position, a movement direction of the input position, and a movement speed of the input position.

The "case in which the operation position is stopped" in step S15 is not limited to a case in which the operation position on the track pad 14 is stopped, but includes a case in which the operation position is moved within a range of a preset threshold value. In both of a case in which the coordinates of the operation position on the track pad 14 detected at a sampling period by the input information acquisition unit 110 are not changed and a case in which a change amount of the coordinates is within the range of the preset threshold value, the control unit 140 determines that the operation position is stopped. The input information acquisition unit 110 detects the coordinates of the operation position on the track pad 14 at the sampling period. Therefore, the control unit 140 may determine that the operation position is stopped in a case in which the coordinates of the operation position detected in the detection operation a plurality of predetermined continuous times are within the range of the threshold value.

For example, the control unit 140 sets the movement direction of the input position to the same direction as the movement direction of the slide gesture detected in steps S11 to S15. The direction of the slide gesture on the track pad 14 is not limited to the X direction illustrated in FIG. 3, but may be the Y direction or an inclination direction and is not limited as long as the slide gesture is moved within the plane of the track pad 14. The movement direction of the input position may correspond to the direction of the slide gesture or may be a direction on the virtual input plane IP. Accordingly, the movement direction of the input position decided in correspondence to the movement direction of the operation position on the track pad 14 by the operation detection unit 183 may be a direction which does not match the movement direction of the operation position.

For example, the control unit 140 sets the movement speed of the input position to a speed corresponding to a movement amount (operation amount) of the slide gesture detected in steps S11 to S15. For example, the control unit 140 sets the movement speed so that the movement speed of the input position is faster as the movement amount of the slide gesture is larger. The movement speed of the input position may be constant. In this case, the control unit 140 sets a preset default movement speed as the movement speed of the input position. The default movement speed is preset and is included in, for example, the setting data 121.

The control unit 140 starts generating the input data according to the movement parameters set in step S16 and starts a process of causing the right display driving unit 22 and the left display driving unit 24 to display the pointer P based on the generated input data (step S17). After step S17, the input position in the input data generated by the control unit 140 is moved and the display position of the pointer P displayed by the image display unit 20 is moved. Thereafter, the control unit 140 continues a process of generating the input data at a predetermined period (for example, the sampling period of the input information acquisition unit 110). The control unit 140 continues a process of moving the display position of the pointer P based on the generated input data.

While the display position of the pointer P is moved, the control unit 140 monitors releasing of the touch on the track pad 14 (step S18). In a case in which the control unit 140 determines that the touch on the track pad 14 is not released (No in step S18), the generation of the input data and the movement of the display position of the pointer P continue.

When the control unit 140 detects that the touch on the track pad 14 is released (Yes in step S18), the control unit 140 stops generating the input data, accordingly stops moving the pointer P (step S19), and ends the present process.

The operation illustrated in FIG. 7 can be applied not only to the movement of the pointer P but also a ring-shaped UI.

Figure 8:
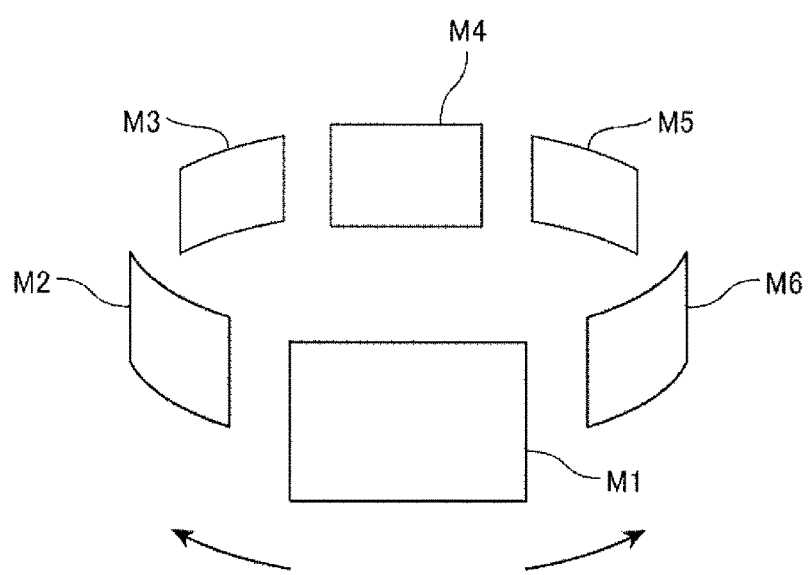
FIG. 8 is a diagram illustrating an example in which display of a ring type UI is transitioned in response to an operation on the track pad.

FIG. 8 is a diagram illustrating an example in which a ring type user interface (UI) transitions in response to an operation on the track pad 14.

The ring type UI is an interface in which a plurality of screens or display objects such as images or text are disposed in a ring shape and a screen or a display object present at a specific position of the ring is enlarged and displayed. In the displayable region D, an image imitating a state in which the plurality of display objects disposed in the ring shape are all overlooked is displayed. Through this display, the user can view the disposition of the display objects forming the ring type UI and content of a display object present at a specific position in the displayable region D.

In the example of FIG. 8, six screens, screens M1 to M6, are prepared as display screens and the screens M1 to M6 are enlarged and displayed in sequence by the image display unit 20 in response to an operation in a right or left direction. The screens M1 to M6 can be switched and displayed in sequence in both of the right direction and the left direction in the drawing.

The GUI control unit 185 can switch and display the screens M1 to M6 in sequence in response to the slide gesture on the track pad 14. That is, the GUI control unit 185 acquires the input data generated in the operation detection unit 183, rotates the ring type UI in a direction corresponding to a change in the input position included in the input data, and displays the screens M1 to M6 in sequence. The input data generated by the operation detection unit 183 are two-dimensional data indicating the input position as the coordinates of the X-Y coordinate system, as exemplified in FIG. 6. In this case, the GUI control unit 185 may calculate both of a change in the X coordinate of the input position and a change in the Y coordinate of the input position and obtains the number of the screens or the movement direction of the screens moving in the ring type UI. The GUI control unit 185 may obtain the number of screens or the movement direction of the screens moving in the ring type UI based on one of the X and Y coordinates of the input position.

In the ring type UI of FIG. 8, each of the screens M1 to M6 corresponds to the display object according to the invention. The GUI control unit 185 moves the display position of each of the screens M1 to M6 in response to an operation on the track pad 14. When the operation of FIG. 7 is applied, the screens M1, M2, M3, etc. are sequentially switched in a case in which the slide gesture on the track pad 14 is detected, and the switching of the screens continues until the touch on the track pad 14 is released. When the user detaches the operating body from the track pad 14, the switching of the screens is stopped. In this sway, the invention can be applied to improve the operability of the track pad 14 without being limited to the movement of the display position of the pointer P. In a case in which the ring type UI of FIG. 8 is adopted, the GUI control unit 185 may sets a screen displayed at a specific position among the screens M1 to M6 as an operation target. The specific position is, for example, the middle of the display screen and is greater than the other screens. The screen displayed in front of the user is an operation target. In this case, the display position of the screen of the operation target is moved in correspondence to a direction of an operation on the track pad 14 and the display positions of the other screens are appropriately moved according to a change in the display position of the screen of the operation target.

In a case in which the control unit 140 according to the embodiment determines that the operation on the track pad 14 is not the slide gesture (No in step S13), the control unit 140 generates the input data indicating the input position corresponding to the operation position on the track pad 14. Accordingly the pointer P is displayed at the display position of the displayable region D corresponding to the operation position on the track pad 14 (step S14). In this way, in the embodiment, for example, the coordinates of the operation position on the track pad 14 detected by the input information acquisition unit 110 are converted into the input position on the virtual input plane IP. That is, the track pad 14 functions as a device that inputs absolute coordinates. The configuration of the HMD 100 is not limited thereto. For example, the input information acquisition unit 110 may output a change in the operation position on the track pad 14 as a detection value to the control unit 140. In this case, the control unit 140 may generate input data indicating a change in the input position corresponding to a change amount of the operation position on the track pad 14. That is, the track pad 14 may be configured to function as an input device that inputs a relative position as in a mouse or the like.

As described above, the HMD 100 according to the first embodiment to which the invention is applied includes the image display unit 20 that allows the user to view an image and transmits an outside scenery. The HMD 100 includes the input information acquisition unit 110 that detects an operation on the track pad 14 and the control unit 140 that displays an operation target display object such as the pointer P on the image display unit 20. The control unit 140 moves the display position of the pointer P in response to a change in the operation position on the track pad 14 detected by the input information acquisition unit 110. In a case in which the input information acquisition unit 110 detects an operation corresponding to a preset ending condition, the control unit 140 stops moving the display position of the pointer P. In other words, the control unit 140 moves the display position of the pointer P so that the inertia of the pointer P which is a display object is maintained until the operation on the track pad 14 which is an operation surface ends. Therefore, the pointer P can be moved greater than a movement amount of the operation position on the track pad 14, and thus it is possible to ease restriction on the operability caused due to the size of the track pad 14. Further, the position at which the movement of the pointer P stops can be easily controlled, and thus it is possible to achieve an improvement in the operability.

In the embodiment, the control unit 140 detects the operation position in a case in which the input information acquisition unit 110 detects a touch on the track pad 14. In a case in which the operating body is detached from the track pad 14 and the input information acquisition unit 110 detects that the touch is released, the control unit 140 determines that the operation corresponds to the ending condition and stops generating the input data. Accordingly, since the user can easily give an instruction of timings at which the movement of the display position of the pointer P starts and stops, it is possible to further achieve the improvement in the operability.

The control unit 140 sets the movement direction of the display position of the pointer P to a direction corresponding to the movement direction of the operation position on the track pad 14. Therefore, the user can move the pointer P in an intended direction, and thus it is possible to achieve the improvement in the operability.

After an operation of the slid gesture on the track pad 14 is detected, the control unit 140 performs the process of obtaining the movement direction of the pointer P, and then moves the pointer P. Therefore, it is possible to move the pointer P in an appropriate direction.

In the embodiment, after the input information acquisition unit 110 detects the operation on the track pad 14 in step S11, the control unit 140 may move the pointer P while performing the process of obtaining the movement direction of the display position of the pointer P in step S16. Here, the control unit 140 moves the pointer P to the display position corresponding to the operation position of the track pad 14. In this case, even while the process of obtaining the movement direction of the pointer P, the pointer P is appropriately moved, and thus the user can perform an operation without discomfort. It is possible to move the pointer P in a short time or in response to an operation in which a movement amount of the operation position is small. The movement of the pointer P in this case may be performed through control of moving the pointer P to the display position of the displayable region D corresponding to the operation position on the track pad 14. After the input information acquisition unit 110 detects the operation on the track pad 14, the control unit 140 may perform the process of obtaining the movement direction of the display position of the pointer P and subsequently move the display position of the pointer P. In this case, it is possible to move the pointer P in an appropriate direction.

The control unit 140 may obtain the movement speed of the pointer P according to the operation on the track pad 14 and move the pointer P in the movement direction at the obtained movement speed. For example, the control unit 140 may set the movement speed of the display position of the pointer P to a speed corresponding to the movement speed or the movement amount of the operation position on the track pad 14. In this case, since the user can control the movement speed of the pointer P, it is possible to further achieve the improvement in the operability.

After the movement of the operation position on the track pad 14 is detected, the control unit 140 moves the pointer P until the operation ends. Therefore, the track pad 14 may be smaller than, for example, the region in which the image display unit 20 displays an image. The track pad 14 may have a size in which a direction of the movement of the operation position can be detected by the control unit 140. In other words, the pointer P can be moved greater than the size of the track pad 14. Accordingly, even when the track pad 14 is small in the configuration of the HMD 100, the pointer P can be moved in any direction, and thus it is possible to achieve the improvement in the operability. Further, there is the advantage of improving the degree of freedom of the configuration of the HMD 100.

In the HMD 100, the control unit 140 generates the input data on the virtual input plane IP in response to an operation detected by the input information acquisition unit 110. In a case in which the input information acquisition unit 110 detects an operation of moving the operation position on the track pad 14, the control unit 140 starts generating the input data on the virtual input plane IP in response to the operation. In a case in which the input information acquisition unit 110 detects an operation corresponding the preset ending condition, the control unit 140 stops generating the input data. Accordingly, it is possible to generate the input data on the virtual input plane IP of the operating system 150 beyond the restriction on the size of the track pad 14. In the embodiment, since the display position of the pointer IP is moved based on the input data, it is possible to control the movement amount of the display position of the pointer P with the high degree of freedom. Accordingly, it is possible to ease the restriction on the operability caused due to the size of the track pad 14.

The input data generated by the control unit 140 can include at least one of an input position on the virtual input plane IP, a movement direction of the input position inside the virtual input plane IP, and a movement speed of the input position inside the virtual input plane IP. Accordingly, it is possible to input the input position, the movement direction of the input position, or the movement speed of the input position on the virtual input plane IP through an operation on the track pad 14.

The control unit 140 may set at least one of the movement direction of the input position and the movement speed of the input position included in the input data according to the movement amount or the movement speed of the operation position detected by the input information acquisition unit 110. In this case, it is possible to control the input position, the movement direction of the input position, or the movement speed of the input position through an operation on the track pad 14.

In a case in which the input information acquisition unit 110 detects that a touch on the track pad 14 is released, the control unit 140 may determine that the operation corresponds to the ending condition and stop generating the input data. In this configuration, since the user can easily give an instruction of timings at which the generation of the input data starts and stops, it is possible to further achieve the improvement in the operability.

As illustrated in FIG. 6, in the HMD 100, the virtual input plane IP and the displayable region D (display region) in the image display unit 20 can be associated. The control unit 140 can control the display position of the pointer P which is an operation target display object displayed on the image display unit 20 in correspondence to the input data. Accordingly, the display position of the pointer P can be moved according to the operation on the track pad 14, and thus it is possible to control the movement amount of the display position with the high degree of freedom.

Second Embodiment

Figure 9:
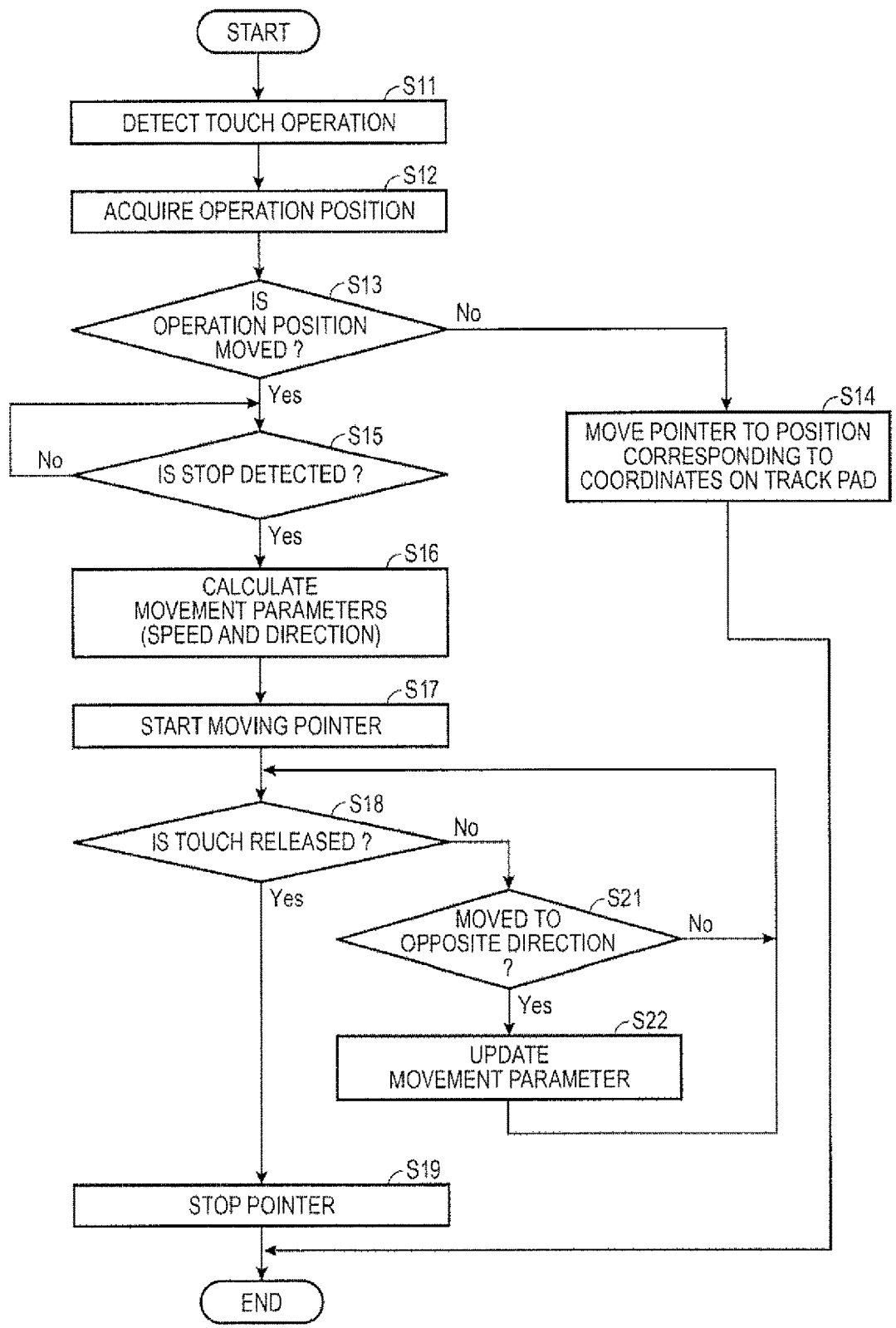
FIG. 9 is a flowchart illustrating an operation of an HMD according to a second embodiment.

FIG. 9 is a flowchart illustrating an operation of an HMD 100 according to a second embodiment to which the invention is applied.

In the second embodiment, the configuration of the HMD 100 is the same as that of the first embodiment. Therefore, the configuration of the HMD 100 is not illustrated and the description thereof will be omitted.

Steps S11 to S19 of the operation illustrated in FIG. 9 are the same as those of the foregoing first embodiment.

In the second embodiment, in step S17, the control unit 140 changes the movement parameters of the display position of the pointer P in a case in which the operation position on the track pad 14 is changed after the generation of the input data and the movement of the display position of the pointer P start.

As in the first embodiment, the control unit 140 monitors the releasing the touch to the track pad 14 after the generation of the input data starts (step S18). Here, while the touch to the track pad 14 is not released (No in step S18), the control unit 140 continuously generates the input data. Accordingly, the display position of the pointer P is continuously moved. Meanwhile, the operation position on the track pad 14 is determined to be stopped in step S15 and is considered to be in the stop state.

In a case in which the touch to the track pad 14 is not released (No in step S18), the control unit 140 determines whether the operation position on the track pad 14 is moved in the opposite direction (step S21). The "opposite direction" refers to a movement direction of the operation position on the track pad 14 detected in step S13 or an opposite direction to the movement parameters of the input position set in step S16. The "opposite direction" is not limited to a case of the direction in which the components of the X axis direction and the Y axis direction are completely opposite. For example, a direction in which the components of the X axis direction and the Y axis direction are within a predetermined range of the completely opposite direction can be included in the "opposite direction". That is, in step S21, the operation position may be determined to be moved in the opposite direction in a case in which the operation position on the track pad 14 is moved in the range considered to be the opposite direction. An operation having a difference in a direction at a predetermined angle or more from the movement direction of the operation position on the track pad 14 detected in step S13 or the movement direction indicated by the movement parameters of the input position set in step S16 may be determined to be moved in the opposite direction. In step S21, the determination may be performed based on a movement amount of the operation position on the track pad 14. For example, in a case in which the movement amount of the operation position is less than a preset threshold value, the operation position is determined not to be moved in the opposite direction.

In a case in which the operation position on the track pad 14 is determined to be moved in the opposite direction (Yes in step S21), the control unit 140 updates (changes) the movement parameter regarding the movement speed of the input position (step S22). After step S22, the control unit 140 generates the input data based on the movement parameters after the updating, and thus the display position of the pointer P is moved. After step S22, the control unit 140 returns the process to step S18. In a case in which the operation position on the track pad 14 is not moved in the opposite direction (No in step S21), the control unit 140 returns the process to step S18.

In step S22, for example, the movement speed of the input position can be changed step by step and the movement speed can be decreased by one step. In this case, whenever the control unit 140 detects the operation of moving the operation position once in the opposite direction, the movement speed of the input position is decreased by one step. The movement speed of the pointer P is changed step by step in response to a change in the movement speed of the input position in regard to the input data. Accordingly, the user can easily control the movement speed of the pointer P.

In this way, the control unit 140 changes the movement speed of the pointer P according to the change in the operation position on the track pad 14 during the movement of the pointer P, and thus the user can control the movement speed of the pointer P more finely.

In the second embodiment, the example has been described in which the movement speed of the input position in regard to the input data is decreased and the movement speed of the pointer P which is the display object is changed to the low speed in the case in which the control unit 140 determines that the operation position by the operating body is moved in the opposite direction. In this case, in a case in which the operation position on the track pad 14 is moved in the positive direction after the change in the movement speed of the input position, the movement speed of the input position may be returned. The number of movements is not limited. The movement speed of the input position may be increased whenever the movement of the operation position in the positive direction is detected. The movement speed of the input position may be decreased whenever the movement of the operation position in the opposite direction is detected. In a configuration in which the area of a region in which the operating body touches the track pad 14 can be detected by the input information acquisition unit 110 and the control unit 140, the movement speed of the input position may be changed with the change in the touch area. For example, in a case in which the touch area is changed to be decreased, the movement speed of the input position may be decreased. In a case in which the touch area is increased, the movement speed of the input position may be increased. In this case, when the movement parameter is updated so that the movement speed of the input position is changed, the movement speed of the pointer P is changed. Therefore, the movement speed of the pointer P can be easily controlled through an operation by the user. Additionally, a specific form in which the speed at which the input position is moved is changed according to the operation form on the track pad 14 can be changed arbitrarily.

Further, as a modification example of the second embodiment, the movement speed of the input position in regard to the input data may be changed in response to an operation of moving the control device 10.

As illustrated in FIG. 2, the control device 10 includes the tri-axial sensor 113 which is an acceleration sensor of three axes.

The operation detection unit 183 acquires a detection value of the tri-axial sensor 113, for example, a preset sampling period, after start of the generation of the input data in step S16 and detects a change in the posture of the control device 10. In the HMD 100, the movement speed of the pointer P is set to be increased in a case in which the control device 10 is activated in a first direction, and the movement speed of the pointer P is set to be decreased in a case in which the control device 10 is activated in a second direction. Specifically, a detection value of the tri-axial sensor 113 or a range of the detection value corresponding to a motion in the first direction is preset. The same also applies to the second direction. The first and second directions may be two directions which can be distinguished based on the detection value of the tri-axial sensor 113 by the operation detection unit 183, or may be opposite directions. The first and second directions may be directions in which the control device 10 is moved straightly or may be directions in which the control device 10 can be rotated. Any rotation direction of the control device 10 can be set. The control device 10 may be rotated about a detection axis of the tri-axial sensor 113 or may be rotated about an axis not parallel to the detection axis.

Here, the operation detection unit 183 may be configured to be able to perform the process of updating the movement parameter according to the detection value of the tri-axial sensor 113 only when the operation position is stopped. That is, the operation detection unit 183 may perform the foregoing process only when the operation position is determined to be stopped (Yes in step S15) and the touch on the track pad 14 is determined to be released (Yes in step S18). The operation detection unit 183 may be configured to perform the foregoing process while the input data is generated.

In a case in which an operation in the first direction or an operation in the second direction is determined to be performed based on the detection value of the tri-axial sensor 113, the operation detection unit 183 performs the same process as step S22 and updates the movement parameter regarding the movement speed of the input position.

In this configuration, by activating the control device 10 while the user performs an operation of touching the track pad 14 with an operating body and moves the pointer P, it is possible to increase or decrease the movement speed of the pointer P.

As another modification example of the second embodiment, the movement speed of the input position in regard to the input data may be changed in correspondence to a touch area on the track pad 14. The input information acquisition unit 110 can detect a touch position and can also detect a touch area in a case in which the operating body touches the track pad 14.

In this case, the input information acquisition unit 110 can be configured to be able to detect a plurality of touch positions on the track pad 14. The operation detection unit 183 calculates an area in which the operating body touches the track pad on the assumption that one operating body is touched at a plurality of touch positions detected by the input information acquisition unit 110. That is, the operation detection unit 183 calculates the touch area based on operation data output by the input information acquisition unit 110. The input information acquisition unit 110 may be configured to be able to detect the touch area on the track pad 14. In this case, the input information acquisition unit 110 outputs data indicating the touch area on the track pad 14, including the operation data.

After the generation of the input data in step S16 starts, the operation detection unit 183 acquires the touch area on the track pad 14 based on the operation data output by the input information acquisition unit 110. Here, the operation detection unit 183 changes the movement speed at the input position in the input data based on the acquired touch area. For example, the movement speed of the input position may be set in association with the size of the touch area acquired by the operation detection unit 183. In this case, the operation detection unit 183 updates the movement parameter of the input data regarding the movement speed of the input position to a value corresponding to the acquired touch area. For example, the operation detection unit 183 may update the movement parameter in response to a change in the acquired touch area. Specifically, the operation detection unit 183 calculates the change in the touch area on the track pad 14, and updates the movement parameter so that the movement speed of the input position is increased by the preset speed in a case in which the touch area increases over a preset threshold value. The operation detection unit 183 updates the movement parameter so that the movement speed of the input position is decreased by the preset speed in a case in which the touch area on the track pad 14 is decreased over the preset threshold value.

Here, the operation detection unit 183 may be configured to be able to perform the process of updating the movement parameter according to the touch area on the track pad 14 only when the operation position is stopped. That is, the operation detection unit 183 may perform the foregoing process only when the operation, position is determined to be stopped (Yes in step S15) and the touch on the track pad 14 is determined to be released (Yes in step 918). The operation detection unit 183 may be configured to perform the foregoing process while the input data is generated.

In this configuration, by adjusting the area in which the operating body touches the track pad 14 while the user performs an operation of touching the track pad 14 with the operating body and moves the pointer P, it is possible to increase or decrease the movement speed of the pointer P. For example, in a case in which the operating body with elasticity, such as a finger or a hand of the user, is used, the operation detection unit 183 can increase or decrease the movement speed of the pointer P by increasing or decreasing a force for pressing the operating body against the track pad 14 to adjust the touch area.

Third Embodiment

Figure 10:
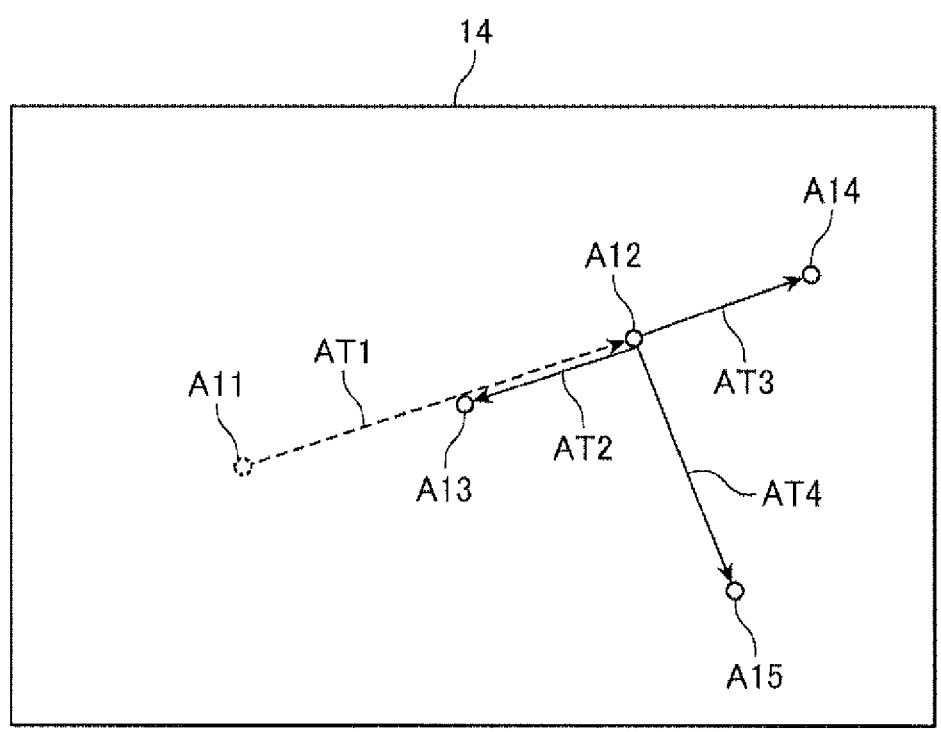
FIG. 10 is a diagram illustrating an example of an operation according to a third embodiment.
Figure 11:
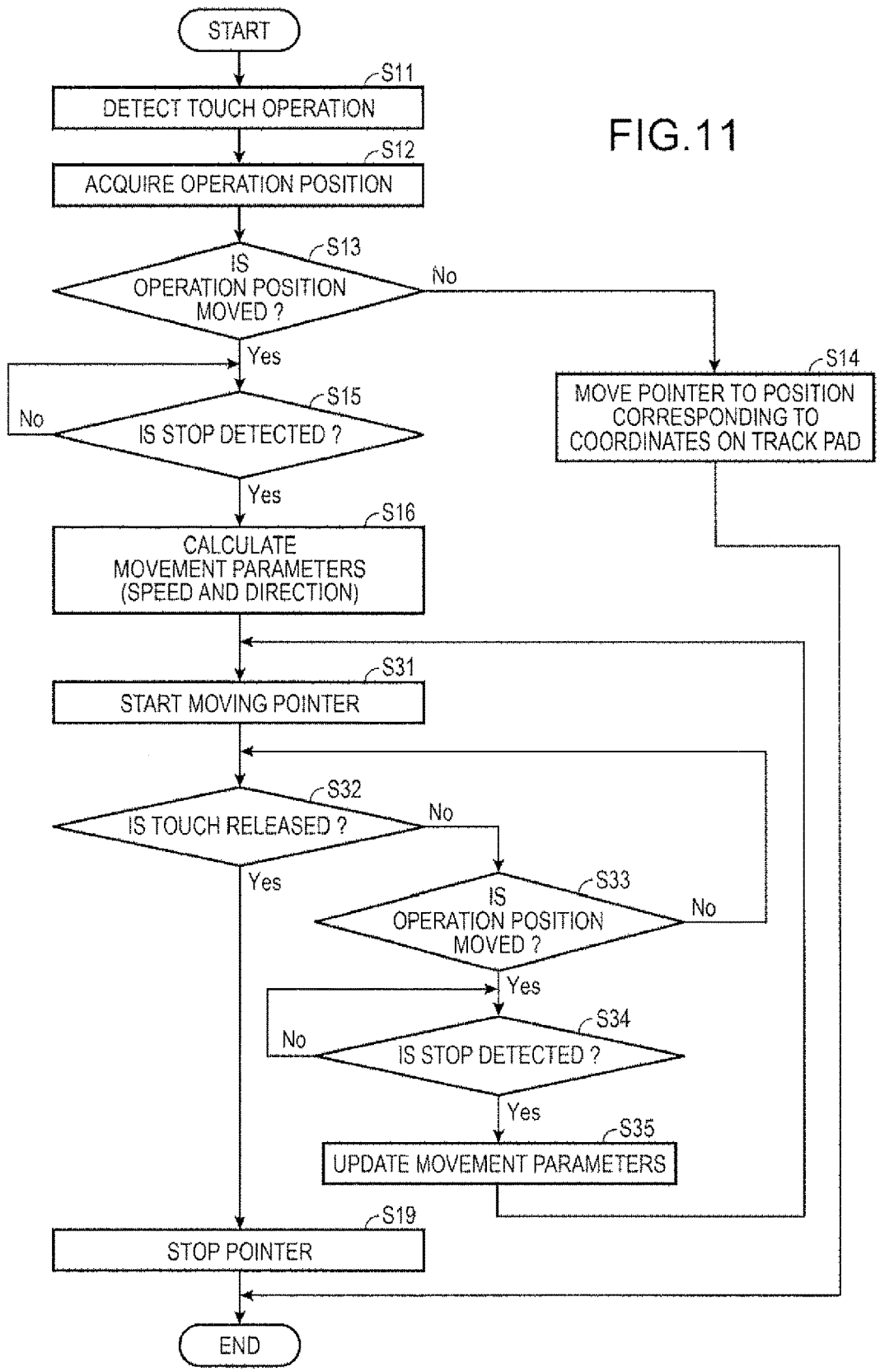
FIG. 11 is a flowchart illustrating an operation of an HMD according to a third embodiment.

FIG. 10 is a diagram illustrating an example of an operation of the HMD 100 according to a third embodiment. FIG. 11 is a flowchart illustrating an operation of the HMD 100 according to the third embodiment to which the invention is applied. In the third embodiment, the configuration of the HMD 100 is the same as that of the first embodiment. Therefore, the configuration of the HMD 100 is not illustrated and the description thereof will be omitted.

In the third embodiment, an example will be described in which the control unit 140 changes a movement speed and a movement direction of the pointer P in a case in which an operation position on the track pad 14 is moved after start of movement of the pointer P. In the second embodiment, an operation in the case in which the operation position on the track pad 14 is operated in the opposite direction has been described. The third embodiment is not limited to the opposite direction, but can correspond to a case in which the operation position is moved in a different direction.

FIG. 10 illustrates, a form of movement of the operation position on the track pad 14. Reference numerals A11 to A15 denote touch positions, that is, operation positions at which an operating body such as the hand H (see FIG. 3) of the user touches the track pad 14. Reference numerals AT1 to AT4 denote trajectories of movement of the operation positions, that is, movement operations. Hereinafter, an operation of the HMD 100 will be described with reference to the flowcharts of FIGS. 10 and 11.

The operation of steps S11 to S16 is the same as the operation according to the first and second embodiments. For example, the control unit 140 calculates the movement parameters corresponding to the operation AT1 in step S16 in a case in which the input information acquisition unit 110 detects the operation AT1 from the operation position A11 to the operation position A12 in FIG. 10. The control unit 140 starts generating the input data according to the movement parameters set in step S16 and starts a process of causing the right display driving unit 22 and the left display driving unit 24 to display the pointer P based on the generated input data (step S31).

After step S31, the input position in the input data generated by the control unit 140 is moved and the display position of the pointer P displayed by the image display unit 20 is moved. While the display position of the pointer P is moved, the control unit 140 monitors releasing of a touch on the track pad 14 (step S32). When the control unit 140 detects that the touch on the track pad 14 is released (Yes in step S32), the control unit 140 stops generating the input data, accordingly stops moving the pointer P (step S19), and ends the present process.

Conversely, in a case in which the control unit 140 determines that the touch on the track pad 14 is not released during the movement of the pointer P (No in step S32), the control unit 140 determines whether the operation position on the track pad 14 is moved (step S33). In step S33, the control unit 140 determines whether the operation position detected by the input information acquisition unit 110 is moved from the position determined to be stopped in step S15 by a predetermined distance or more. In a case in which the control unit 140 determines that the operation position is not moved (No in step S33), the control unit 140 returns the process to step S32.

In a case in which the control unit 140 determines that the operation position is moved (Yes in step S33), the control unit 140 waits until the operation position is stopped (step S34). While the control unit 140 waits, the control unit 140 continuously detect the operation position based on the operation data input from the input information acquisition unit 110. In a case in which the operation position is stopped (Yes in step S34), the control unit 140 calculates the movement parameter of the input data corresponding to the movement of the operation position detected in step S33 and updates the movement parameters (step S35).

The control unit 140 returns the process to step S31 and starts generating the input data using the updated movement parameters.

For example, in a case in which the operation AT1 illustrated in FIG. 10 is performed, the operating body is subsequently stopped at the operation position A12, and the operation AT2 of moving the operating body to the operation position A13 is executed, the control unit 140 generates the movement parameters corresponding to the operation AT2 in step S35. In this case, the control unit 140 sets the movement direction and/or the movement speed of the input position based on at least one of the movement direction from the operation position A12 to the operation position A13, the movement speed, and the movement amount. The movement amount of the input position is decided in accordance with a time in which the operation AT2 is stopped. Here, the control unit 140 may calculate the movement amount of the input position based on the movement speed or the movement amount of the operation AT2.

In this way, in the case in which the operating position is stopped at a first stop position and is subsequently moved and stopped to a second stop position, the operation detection unit 183 can generate the input data based on at least one of the movement direction from the first stop position to the second stop position, the movement speed, and the movement amount. The first stop position corresponds to, for example, the operation position A11 and the second stop position corresponds to, for example, the operation position A12, A13, or A14. In a case in which the operation position is stopped at the operation position A12, A13, or A14 and is subsequently further moved to another position, the operation may be performed setting the operation position A12, A13, or A14 as the first stop position.

According to the third embodiment, in a case in which the operation body is stopped at the operation position A12 and, for example, the operation AT3 of moving the operating body to the operation position A14 or the operation AT4 of moving the operating body to the operation position A15 is subsequently performed, the input data for which the input position is moved to correspond to the operation AT3 or AT4 is generated. By displaying the display object such as the pointer P based on the input data, the HMD 100 can move the display position of the pointer P in a direction and at a speed in which the operations AT2, AT3, or AT4 is reflected.

The processes of steps S33 to S35 are repeatedly performed. Therefore, for example, in a case in which the operating body is moved from the operation position A13 to another position after the operation AT2, the display position of the pointer P can be changed by reflecting this movement. In this case, a configuration in which the operation position is stopped and the number of movement operations is subsequently not restricted can also be employed.

In this way, in a case in which the user performs an operation of changing the direction in which the operating body moves with the operating body touched on the track pad 14, the HMD 100 can move the pointer P to follow the change in the direction of the movement of the operating body.

When a time in which the operation position detected by the input information acquisition unit 110 is determined to be stopped in step S15 or S34 is set to be short, a time in which the user intentionally stops the operating body may be set to be short. The time in which the determination of step S15 or S34 is performed may be set so that at least the input information acquisition unit 110 detects the operation position a plurality of times. For example, the time may be set to be short up to a time corresponding to a two-times worth of the sample period.

Fourth Embodiment

Figure 12:
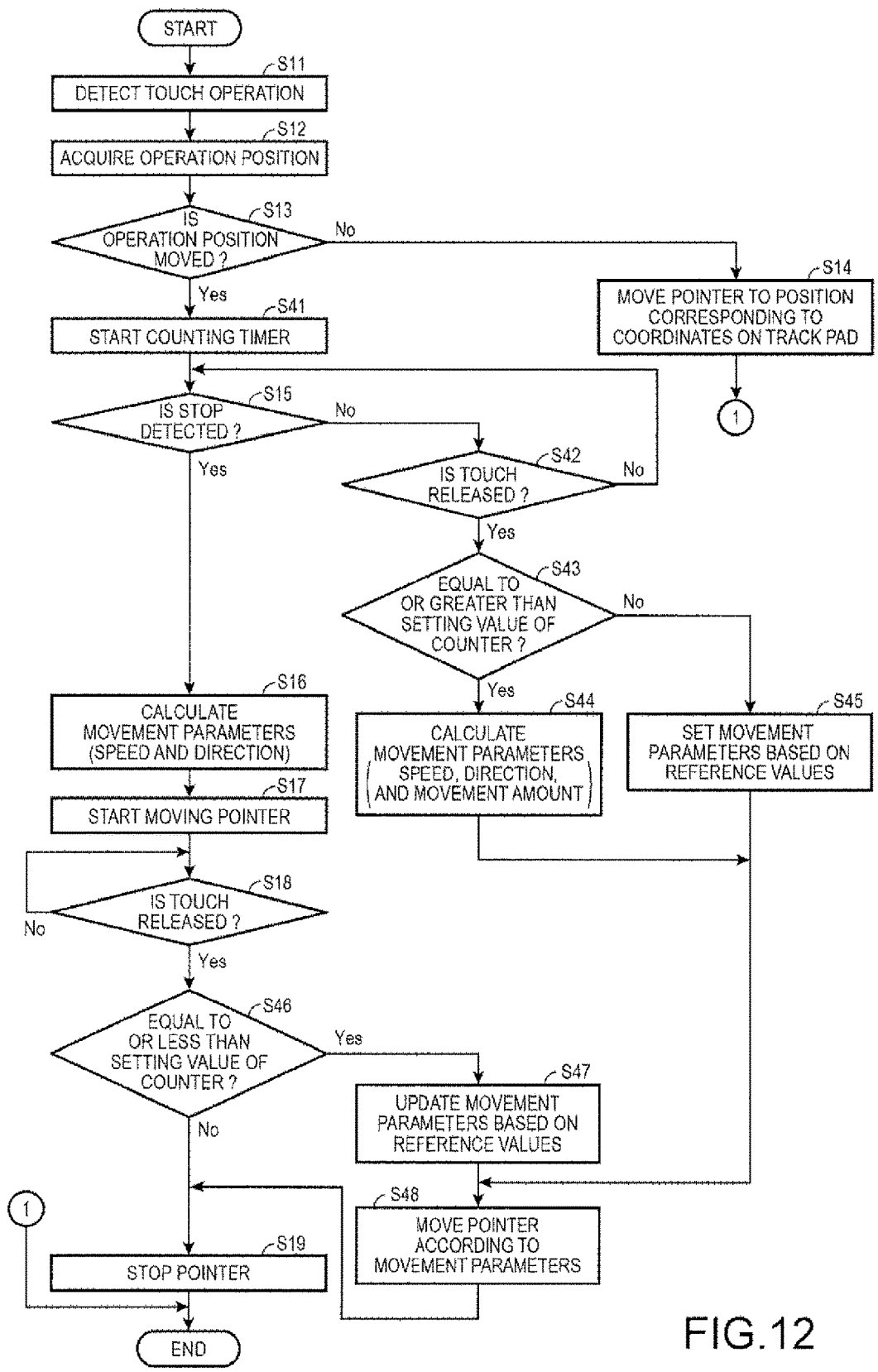
FIG. 12 is a flowchart illustrating an operation of an HMD according to a fourth embodiment.

FIG. 12 is a flowchart illustrating an operation of the HMD 100 according to a fourth embodiment to which the invention is applied. In the fourth embodiment, the configuration of the HMD 100 is the same as that of the first embodiment. Therefore, the configuration of the HMD 100 is not illustrated and the description thereof will be omitted.

In the fourth embodiment, in a case in which a touch operation on the track pad 14 is released in a short time, the HMD 100 is configured to set a movement amount of the display position of the pointer P to a defined amount and to be able to accordingly move the display position of the pointer P through a short-time operation.

Steps S12 to S14 of the operation illustrated in FIG. 12 are the same as those of the foregoing first to third embodiments.

In a case in which an operation on the track pad 14 is determined to be a slide gesture (Yes in step S13), the control unit 140 starts counting a timer (step S41). The timer can be implemented as one function of the control unit 140 that is implemented by a program. The control unit 140 waits until the operation position is stopped (step S15). While the control unit 140 waits, the control unit 140 continuously detects the operation position based on the operation data input from the input information acquisition unit 110.

In a state in which the operation position is not stopped, that is, while the slide gesture continues (No in step S15), the control unit 140 monitors the releasing of the touch on the track pad 14 (step S42). In a case in which the control unit 140 determines that the touch on the track pad 14 is not released (No in step S42), the control unit 140 returns the process to step S15 and monitors the operation position.

Here, in a case in which the control unit 140 detects that the touch operation on the track pad 14 is released (Yes in step S42), the control unit 140 determines whether a count value of the count starting in step S41 is equal to or greater than a preset setting value (step S43). That is, the control unit 140 determines whether the count value of a time until the releasing of the touch on the track pad 14 after the start of the slide gesture is equal to or greater than the setting value or is less than the setting value. The setting value is included in, for example, the setting data 121 to be stored in the storage unit 120.

In a case in which the count value (a value of a timer counter) is equal to or greater than the setting value (Yes in step S43), the control unit 140 calculates the movement parameters of the input data corresponding to the slide gesture (step S44). As in the movement parameter calculated in step S16 to be described below, the movement parameters of the input data calculated in step S44 include, for example, data indicating a starting position of the movement of the input position, a movement direction of the input position, and a movement speed of the input position. The movement parameters calculated and generated in step S44 preferably include data indicating a movement amount. The data indicating the movement amount may be a default value of the preset movement amount, may be a value calculated based on the count value determined in step S43, or may be a movement amount corresponding to the movement amount or the movement speed of the operation position of the slide gesture. After the movement parameters are calculated, the control unit 140 transitions the process to step S48 to be described below. The control unit 140 may perform a process of stopping the count starting in step S41 and resetting the count value before or after the process of step S44.

In a case in which the count value is less than the setting value (No in step S43), the control unit 140 calculates the movement parameters of the input data based on reference values (not illustrated) stored in advance in the storage unit 120 (step S45). The movement parameters generated in step S45 may include, for example, the data indicating the starting position of the movement of the input position, the movement direction of the input position, and the movement speed of the input position and include the data indicating the movement amount. At least one of the starting position of the movement of the input position and the movement direction of the input position may be calculated based on the operation position of the slide gesture detected by the input information acquisition unit 110 or the movement direction of the operation position. The movement speed of the input position or the movement amount may be set based on the reference value stored in advance in the storage unit 120. After the movement parameters are set, the control unit 140 transitions the process to step S48 to be described below. The control unit 140 may perform a process of stopping the count starting in step S41 and resetting the count value before or after the process of step S45.

In a case in which the operation position is stopped (Yes in step S15), the control unit 140 calculates the movement parameter of the input data to generate the input data corresponding to the slide gesture (step S16). The movement parameters of the input data generated in step S16 include, for example, the data indicating the starting position of the movement of the input position, the movement direction of the input position, and the movement speed of the input position, as described above. The movement direction of the input position is set to the same direction as the movement direction of the slide gesture detected in step S11 to S15 for example. The movement speed of the input position is set to, for example, a speed corresponding to the movement amount (operation amount) of the slide gesture or a default value.

The control unit 140 starts generating the input data according to the movement parameters set in step S16 and starts a process of causing the right display driving unit 22 and the left display driving unit 24 to display the pointer P based on the generated input data (step S17). After step S17, the input position in the input data generated by the control unit 140 is moved and the display position of the pointer P displayed by the image display unit 20 is moved. Thereafter, the control unit 140 continues a process of generating the input data at a predetermined period (for example, the sampling period of the input information acquisition unit 110). The control unit 140 continues a process of moving the display position of the pointer P based on the generated input data.

While the display position of the pointer P is moved, the control unit 140 monitors releasing of the touch on the track pad 14 (step S18). In a case in which the control unit 140 determines that the touch on the track pad 14 is not released (No in step S18), the generation of the input data and the movement of the display position of the pointer P continue.

When the control unit 140 detects that the touch on the track pad 14 is released (Yes in step S18), the control unit 140 determines whether the count value of the count starting in step S41 is equal to or greater than the preset setting value (step S46). The setting value is included in, for example, the setting data 121 to be stored in the storage unit 120 or may be a common value to the setting value in step S43.

In a case in which the count value (a value of a timer counter) is equal to or greater than the setting value (Yes in step S46), the control unit 140 stops generating the input data, accordingly stops moving the pointer P (step S19), and ends the present process. The control unit 140 may perform a process of stopping the count starting in step S41 and resetting the count value before or after the process of step S19.

In a case in which the count value is less than the setting value (No in step S46), the control unit 140 calculates the movement parameters of the input data based on reference values (not illustrated) stored in advance in the storage unit 120 (step S47). In step S47, the control unit 140 sets the movement parameters based on the reference values stored in advance in the storage unit 120 and updates the movement parameters calculated in step S16, as in step S45. The control unit 140 may perform a process of stopping the count starting in step S41 and resetting the count value before or after the process of step S47.

The control unit 140 performs a process of generating the input data according to the movement parameters, and thus the display position of the pointer P is accordingly moved (step S48). The control unit 140 performs the process of generating the input data by an amount corresponding to the movement amount included in the movement parameters, and then stops generating the input data and ends the present process.

According to the fourth embodiment, in a case in which the time in which the operating body touches the track pad 14 is short, it is possible to move the pointer P by the preset movement amount. Therefore, the user can move the pointer P by performing an operation of touching the operating body on the track pad 14 in a short time. Accordingly, the display of the image display unit 20 can be controlled through the operation of touching the operating body on the track pad 14 in a short time in addition to an operation of maintaining a state in which the operating body is touched on the track pad 14, and thus it is possible to achieve the improvement in operability.

Fifth Embodiment

Figure 13:
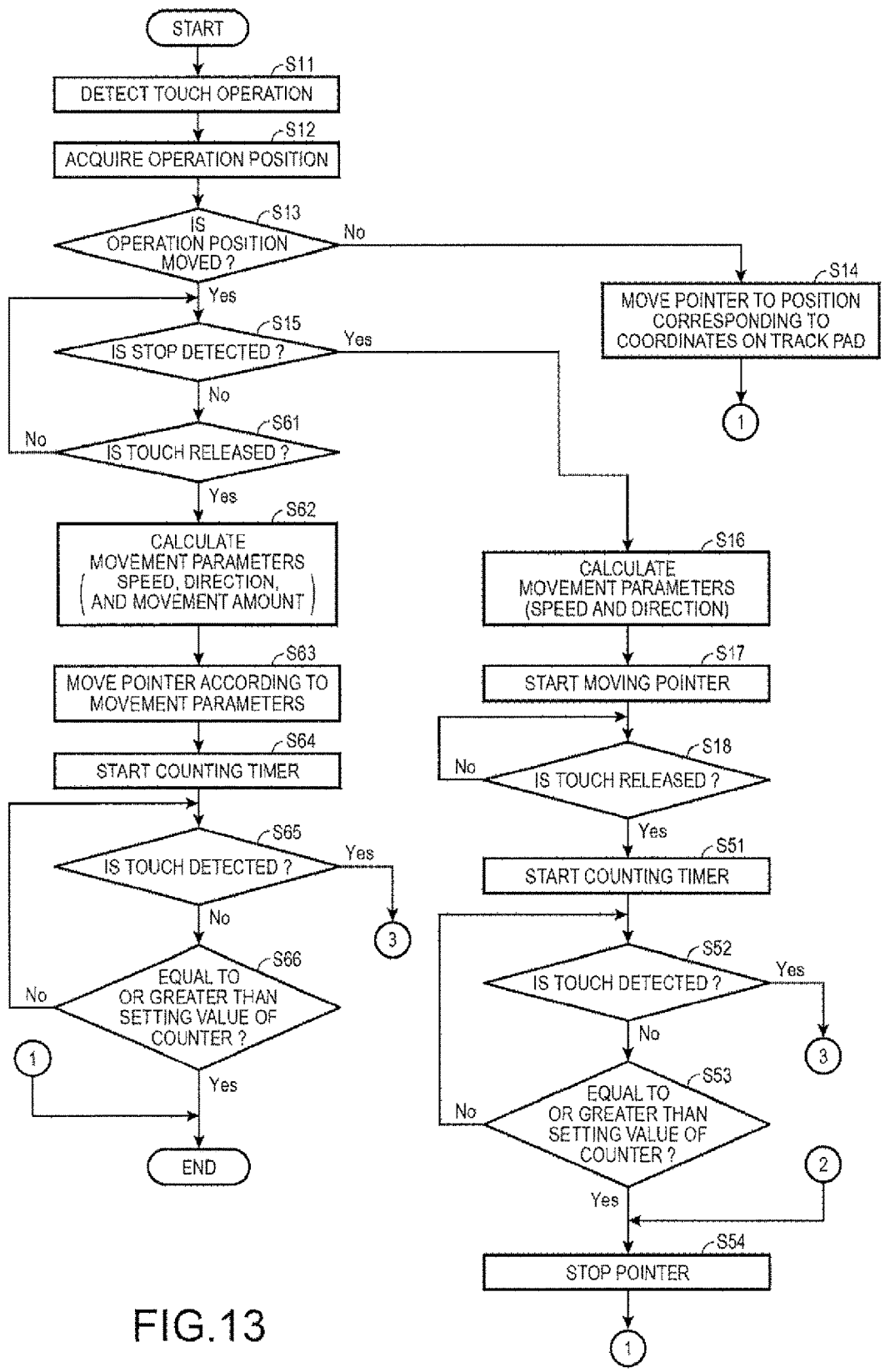
FIG. 13 is a flowchart illustrating an operation of an HMD according to a fifth embodiment.
Figure 14:
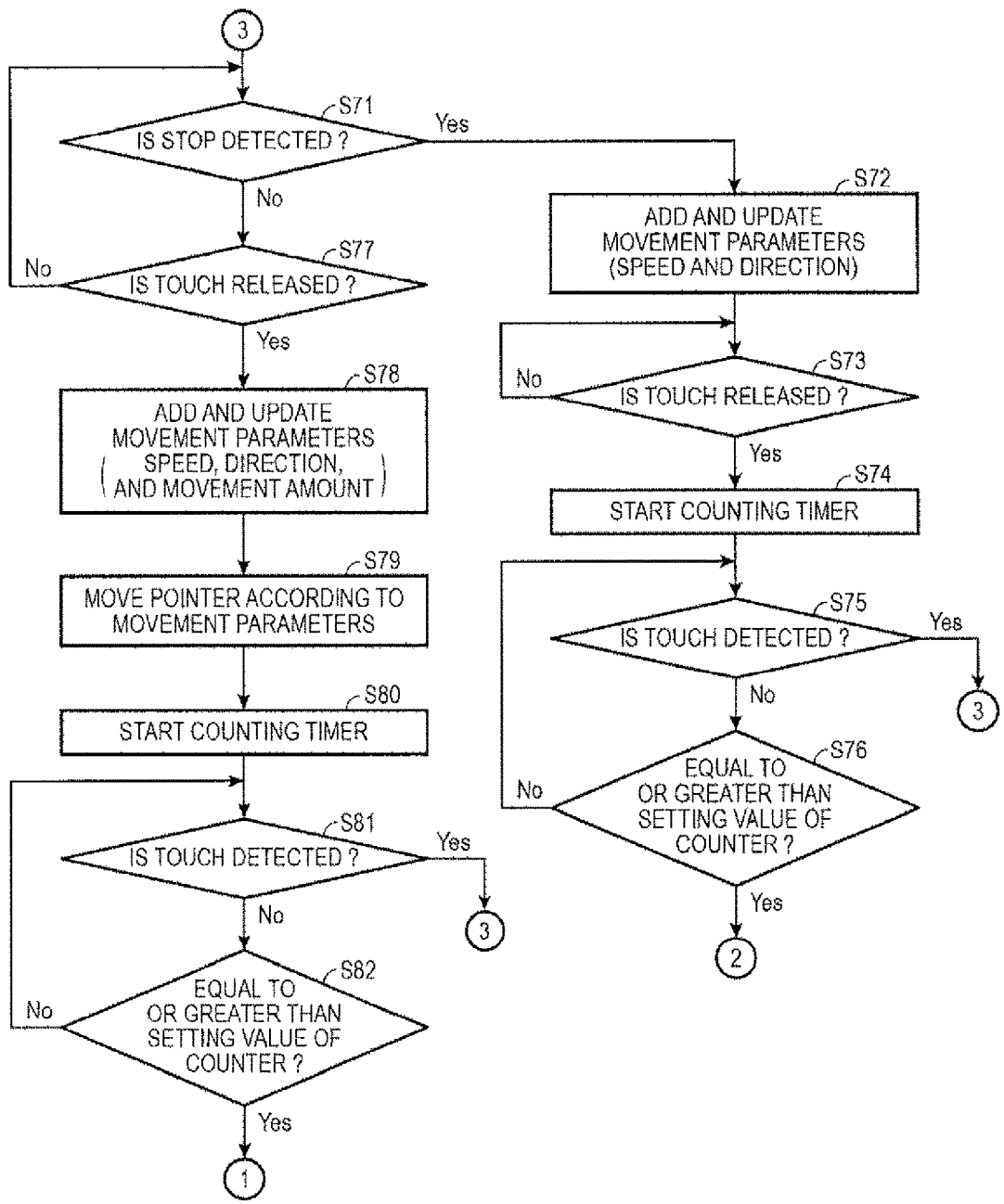
FIG. 14 is a flowchart illustrating an operation of the HMD according to the fifth embodiment.

FIG. 13 is a flowchart illustrating an operation of the HMD 100 according to a fifth embodiment to which the invention is applied. FIG. 14 is a flowchart illustrating an operation of the HMD 100 according to fifth embodiment to which the invention is applied. In the fifth embodiment, the configuration of the HMD 100 is the same as that of the first embodiment. Therefore, the configuration of the HMD 100 is not illustrated and the description thereof will be omitted.

In the fifth embodiment, in a case in which a touch operation is released and a touch operation is subsequently performed again within a predetermined time in a process of moving the display position of the pointer P according to a touch operation on the track pad 14, the HMD 100 processes such touch operations as continuous operations.

The operation of steps S11 to S18 illustrated in FIG. 13 is the same as the first to third embodiments described above. In the fifth embodiment, in a state in which the operation position on the track pad 14 is not stopped, that is, while the slide gesture continues (No in step S15), the control unit 140 monitors the releasing of the touch on the track pad 14 (step S61). In a case in which the control unit 140 determines that the touch on the track pad 14 is not released (No in step S61), the control unit 140 returns the process to step S15 and monitors the operation position.

In a case in which the control unit 140 detects that the touch operation on the track pad 14 is released (Yes in step S61), the control unit 140 calculates the movement parameters of the input data corresponding to the slide gesture (step S62). As in the movement parameter calculated in step S16 to be described below, the movement parameters of the input data calculated in step S62 include, for example, data indicating a starting position of the movement of the input position, a movement direction of the input position, and a movement speed of the input position. The movement parameters calculated and generated in step S62 preferably include data indicating a movement amount. The data indicating the movement amount may be a default value of a present movement amount, or may be a movement amount corresponding to the movement amount or the movement speed of the operation position of the slide gesture.

After the movement parameters are calculated, the control unit 140 performs a process of generating the input data according to the movement parameters, and the display position of the pointer P is accordingly moved (step S63). The control unit 140 performs the process of generating the input data by an amount corresponding to the movement amount included in the movement parameters.

After the generation of the input data starts, the control unit 140 starts counting a timer (step S64). The timer can be implemented as one function of the control unit 140 that is implemented by a program. The control unit 140 monitors a new touch on the track pad 14 (step S65). While the touch on the track pad 14 is not detected (No in step S65), the control unit 140 determines whether the count value of the timer is equal to or greater than the setting value (step S66). Here, in a case in which the count value is equal to or greater than the preset setting value (Yes in step S66), the control unit 140 performs a process of generating the input data of an amount corresponding to the movement amount of the movement parameters and subsequently ends the present process.

In a case in which the count value of the timer does not reach the setting value (No in step S66), the control unit 140 returns the process to step S65 and monitors a touch on the track pad 14.

In a case in which a touch on the track pad 14 is detected (Yes in step S65), the control unit 140 allows the process to proceeds to step S71 (see FIG. 13) to be described below.

When the control unit 140 detects in step S18 that the touch on the track pad 14 is released (Yes in step S18), the control unit 140 starts counting the timer (step S51). The control unit 140 monitors a new touch on the track pad 14 (step S52). While the touch on the track pad 14 is not detected (No in step S52), the control unit 140 determines whether the count value of the timer is equal to or greater than the setting value (step S53). Here, in a case in which the count value is equal to or greater than the preset setting value (Yes in step S53), the control unit 140 stops generating the movement parameters, accordingly stops the movement of the pointer P (step S19) and ends the present process.

In a case in which the count value of the timer does not reach the setting value (No in step S53), the control unit 140 returns the process to step S52 and monitors a touch on the track pad 14. In a case in which a touch on the track pad 14 is detected (Yes in step S52), the control unit 140 allows the process to proceeds to step S71 (see FIG. 13).

An operation after step S71 is an operation corresponding to a case in which the user performs an operation of touching an operating body on the track pad 14 and touches the operating body on the track pad 14 again within a predetermined time after the releasing of the touch.

The control unit 140 monitors whether the touch position on the track pad 14 detected in step S52 or S65, that is, the operation position, is stopped (step S71). While the operation position is not stopped (No in step S71), the control unit 140 monitors releasing of the touch on the track pad 14 (step S72) In a case in which the control unit 140 determines that the touch on the track pad 14 is not released (No in step S72), the control unit 140 returns the process to step S71 and monitors the operation position.

In a case in which the control unit 140 detects that the operation position is stopped (Yes in step S71), the control unit 140 calculates the movement parameters of the input data corresponding to an operation and updates the movement parameters (step S72). The movement parameters calculated in step S72 include, for example, data indicating a starting position of the movement of the input position, a movement direction of the input position, and a movement speed of the input position. After the control unit 140 updates the movement parameters in step 372, the control unit 140 starts a process of generating the input data based on the updated movement parameters.

While the control unit 140 performs the process of generating the input data, the control unit 140 monitors the releasing of the touch on the track pad 14 (step S75). In a case in which it is determined that the touch on the track pad 14 is not released (No in step 375), the generation of the input data continues and the monitoring of step 375 continues. When the control unit 140 detects that the touch on the track pad 14 is released (Yes in step S75), the control unit 140 starts counting the timer (step S74).

The control unit 140 monitors a new touch on the track pad 14 (step S75). While the touch on the track pad 14 is not detected (No in step S75), the control unit 140 determines whether the count value of the timer is equal to or greater than the setting value (step S76). Here, in a case in which the count value is equal to or greater than the preset setting value (Yes in step S76), the control unit 140 allows the process to proceed to step S54, stops generating the movement parameters, accordingly stops the movement of the pointer P (step S54), and ends the present process. After the process of step S76, the control unit 140 may perform a process of stopping the counting started in step S74 and resetting the count value.

In a case in which the count value of the timer does not reach the setting value (No in step S76), the control unit 140 returns the process to step S75 and monitors a touch on the track pad 14.

In a case in which the operation position is not stopped in step S71, that is, the operation position is continuously moved (No in step S71), the control unit 140 monitors releasing of the touch on the track pad 14 (step S77). In a case in which it is determined that the touch on the track pad 14 is not released (No in step S77), the generation of the input data continues and the monitoring of step S77 continues.

When the control unit 140 detects that the touch on the track pad 14 is released (Yes in step S77), the control unit 140 calculates the movement parameters of the input data corresponding to the slide gesture (step S78). The movement parameters calculated in step S78 are, for example, the same as the movement parameters calculated in step S62. That is, the movement parameters may include the data indicating the starting position of the movement of the input position, the movement direction of the input position, and a movement speed of the input position and preferably include data indicating a movement amount. The data indicating the movement amount may be a default value of the preset movement amount or may be a movement amount corresponding to the movement amount or a movement speed of the operation position of the slide gesture. The control unit 140 updates the movement parameters in accordance with the movement parameters calculated in step S78.

The control unit 140 starts a process of generating the input data based on the updated movement parameters, and thus the display position of the pointer P is accordingly moved (Step S79). The control unit 140 starts generating the input data, and subsequently starts counting the timer (step S80). In step S80, the control unit 140 counts an elapsed time after the releasing of the touch in step S77 is detected. Accordingly, the process of step S80 may be performed before step S78 or S79.

The control unit 140 monitors a new touch on the track pad 14 (step S81). While the touch on the track pad 14 is not detected (No in step S81), the control unit 140 determines whether the count value of the timer is equal to or greater than the setting value (step S82). Here, in a case in which the count value is equal to or greater than the preset setting value (Yes in step S82), the control unit 140 generates the input data corresponding to the movement amount of the movement parameters and subsequently ends the present process. In a case in which the count value of the timer does not reach the setting value (No in step S82), the control unit 140 returns the process to step S81 and monitors a touch on the track pad 14.

In a case in which a touch on the track pad 14 is detected (Yes in step S81), the control unit 140 returns the process to step S71 (see FIG. 13). When the touch on the track pad 14 is detected (Yes in step S81), the control unit 140 may perform a process of stopping the counting started in step S80 and resetting the count value.

In the fifth embodiment, in the case in which the control unit 140 detects that the operating body is detached from the track pad 14 and the touch is released, and then a predetermined time passes, the control unit 140 determines that the operation corresponds to the ending condition in which the operation is considered to end and performs the operation of the case in which the operation is released. For example, the control unit 140 stops generating the input data.

Accordingly, even after the operating body is detached from the track pad 14, the movement of the display position of the pointer P can continue. Therefore, it is possible to move the display position of the pointer P greater than the movement amount of the operation position on the track pad 14, and thus it is possible to avoid restriction on the size of the track pad 14.

The control unit 140 updates the movement parameters in correspondence to the operation position of a new touch in a case in which the operation detection unit detects that the operating body is detached from the track pad 14, detects that the touch is released, and subsequently detects the touch on the track pad 14 within a predetermined time. Because of the updating of the movement parameters, at least one of the movement direction and the movement speed of the display position of the pointer P is changed. Accordingly, even after the operating body is detached from the track pad 14, the user can control the movement of the display position of the pointer P when performing an operation of touching the operating body on the track pad 14 again. Therefore, it is possible to control a form of the movement of the display position of the pointer P with the high degree of freedom. For example, in a case in which an operation of touching the operating body on the track pad 14 is performed again within the predetermined time, the control unit 140 can detect a plurality of operations performed at intervals of a state in which the operating body becomes away from the track pad 14 as a series of operations.

The control unit 140 can repeatedly perform an operation of monitoring a touch until the count value of the timer reaches the setting value after the releasing of the touch on the track pad 14.

Figure 15:
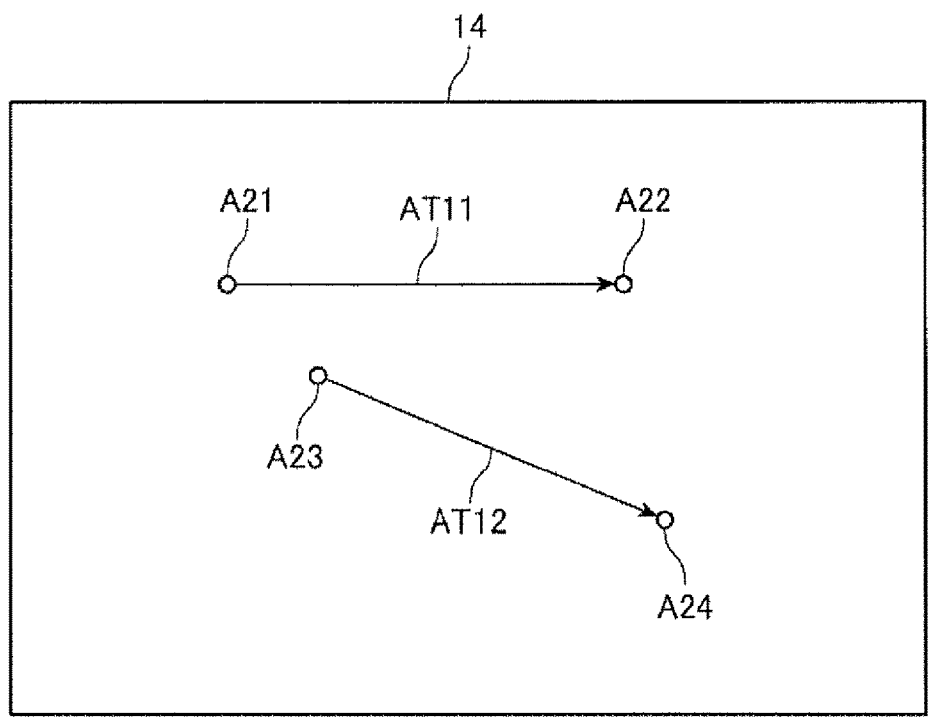
FIG. 15 is a diagram illustrating an example of an operation according to the fifth embodiment.

FIG. 15 is a diagram illustrating an example of an operation on the track pad 14 according to the fifth embodiment. The example of FIG. 15 is an example in which operations AT11 and AT12 are performed twice on the track pad 14. More specifically, in this example, the operation AT11 of moving the operating body from an operation position A21 to an operation position A22 is performed, the operating body subsequently becomes away from the track pad 14, the operating body is subsequently touched on the track pad 14 at an operation position A23, and the operating body is moved up to an operation position A24.

Here, a time in which the operating body is detached from the track pad 14 at the operation position A22 and is subsequently touched on the track pad 14 at the operation position A23 is assumed to be shorter than a predetermined time. The predetermined time corresponds to the setting value (step S53, S66, S76, or S88) set in regard to the count value of the timer counted by the control unit 140.

In this case, the control unit 140 performs a process of generating the movement parameters based on the operation AT11 and generating the input data. Therefore, although the display position of the pointer P is not illustrated, the display position is moved in the movement direction or at the movement speed in which the operation AT11 is reflected.

In a case in which the operation AT12 is detected, the control unit 140 generates and updates the movement parameters in response to the operation AT12. Here, the control unit 140 can update the movement parameters in correspondence to the operation position A22 which is a starting position of the operation AT12, the operation position A23 which is an ending point, a movement direction of the operation position of the operation AT12, a movement speed of the operation position, a touch time, and the like.

Based on a result obtained by combining the operations AT11 and AT12, the control unit 140 may generate and update the movement parameters. Specifically, the control unit 140 generates a vector indicating the movement direction and the movement amount of the operation position in regard to the operation AT11. In the case in which the operation AT12 is detected, the control unit 140 generates a vector indicating the movement direction and the movement amount of the operation position in regard to the operation AT12. The control unit 140 generates a combined vector by combining the vector of the operation AT11 and the vector of the operation AT12. The control unit 140 may generate the movement parameters corresponding to the combined vector. In this case, the operations AT11 and AT12 can be set as one operation and the input data can be generated in response to this operation. In this case, through a process of moving the display position of the pointer P based on the input data, the movement direction, the movement speed, or the like of the pointer P can be gently changed according to an operation by the user.

Further, the control unit 140 may generate the input data in response to the operation AT11, and subsequently generate the input data in response to the operation AT12. That is, the control unit 140 may generate the movement parameters corresponding to the operation AT11, perform a process of generating the input data according to the movement parameters, and subsequently update the movement parameters in response to the operation AT12. That is, in a case in which a plurality of operations are performed at a non-operation period within a predetermined time, the control unit 140 can generate the input data so that the plurality of operations are accumulatively reflected. In this case, the display position of the pointer P can be moved reflecting the operations AT11 and AT12 in sequence.

Even after the operating body becomes away from the track pad 14 at the operation position A22, the control unit 140 continuously generating the input data, and therefore the movement of the display position of the pointer P continues. Therefore, even after the user detaches the operating body from the track pad 14, the pointer P can be moved. Further, when an operation of touching the track pad 14 within a predetermined time, the display position can be moved without stopping the pointer P.

In a case in which the foregoing various operations are performed, the generation of the input data may be stopped through an operation in a state in which the operating body is not touched on the track pad 14 and a state in which the input data is generated. Within a predetermined time after the control unit 140 detects that the touch on the track pad 14 is released, the input data is generated and the pointer P is moved. For example, in a case in which an operation of knocking (tapping) the track pad 14 is performed during the movement of the pointer P, the control unit 140 may stop or interrupt the generation of the input data irrespective of an elapsed time. For example, in a case in which the control unit 140 detects an operation of moving the control device 10 by the tri-axial sensor 113 during the movement of the pointer P, the generation of the input data may be stopped or interrupted irrespective of an elapsed time. For example, in a case in which the control unit 140 detects an operation of knocking the image display unit 20 or an operation of activating the image display unit 20 in a predetermined direction by the 9-axial sensor 66, the generation of the input data may be stopped or interrupted irrespective of an elapsed time.

In the fifth embodiment, in a case in which the operating body becomes away from the track pad 14 and subsequently a predetermined condition is satisfied for the previous operation in an operation detected within a predetermined time, the control unit 140 may be configured to perform a preset process. The predetermined condition is, for example, a condition in a case in which the operating body becomes away from the track pad 14 and then a movement direction of the operation position in the operation detected within a predetermined time is an opposite direction to the direction of the previous operation. The process performed by the control unit 140 is, for example, a process of decreasing the movement speed of the input position in the movement parameters. The predetermined condition may be a condition in which an operation of moving the control device 10 is detected by the tri-axial sensor 113. A specific direction may be set for a motion of the control device 10 detected in this case. In this case, the control unit 140 may perform, for example, a process of increasing or decreasing the movement speed of the input position in the movement parameters according to a motion of the control device 10 or a direction of the motion. For example, a process of changing the movement direction of the input position in the movement parameters in correspondence to the direction of the motion of the control device 10 may be performed.

Sixth Embodiment

Figure 16:
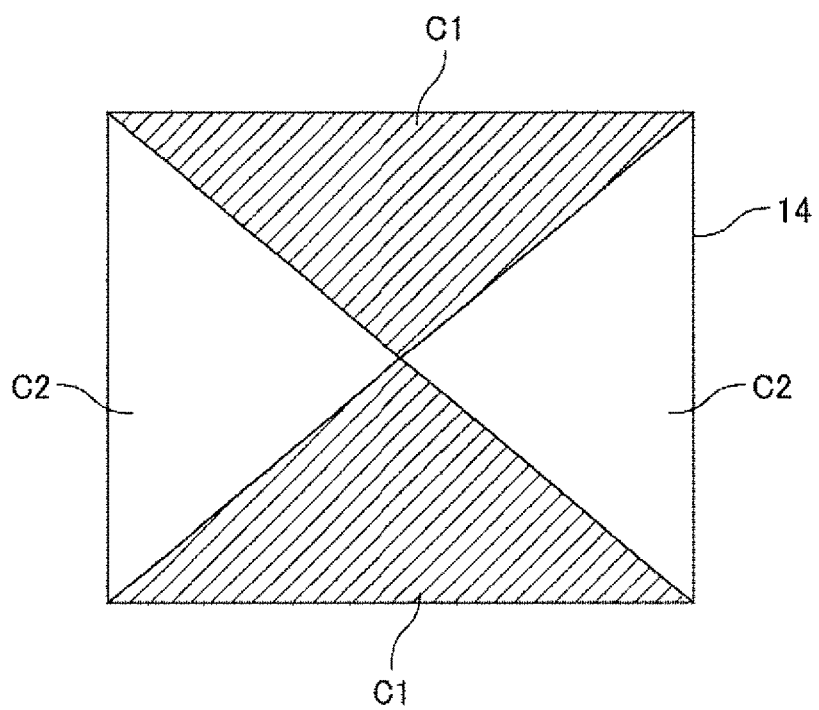
FIG. 16 is a diagram illustrating a setting state of an operation region on the track pad according to a sixth embodiment.
Figure 17:
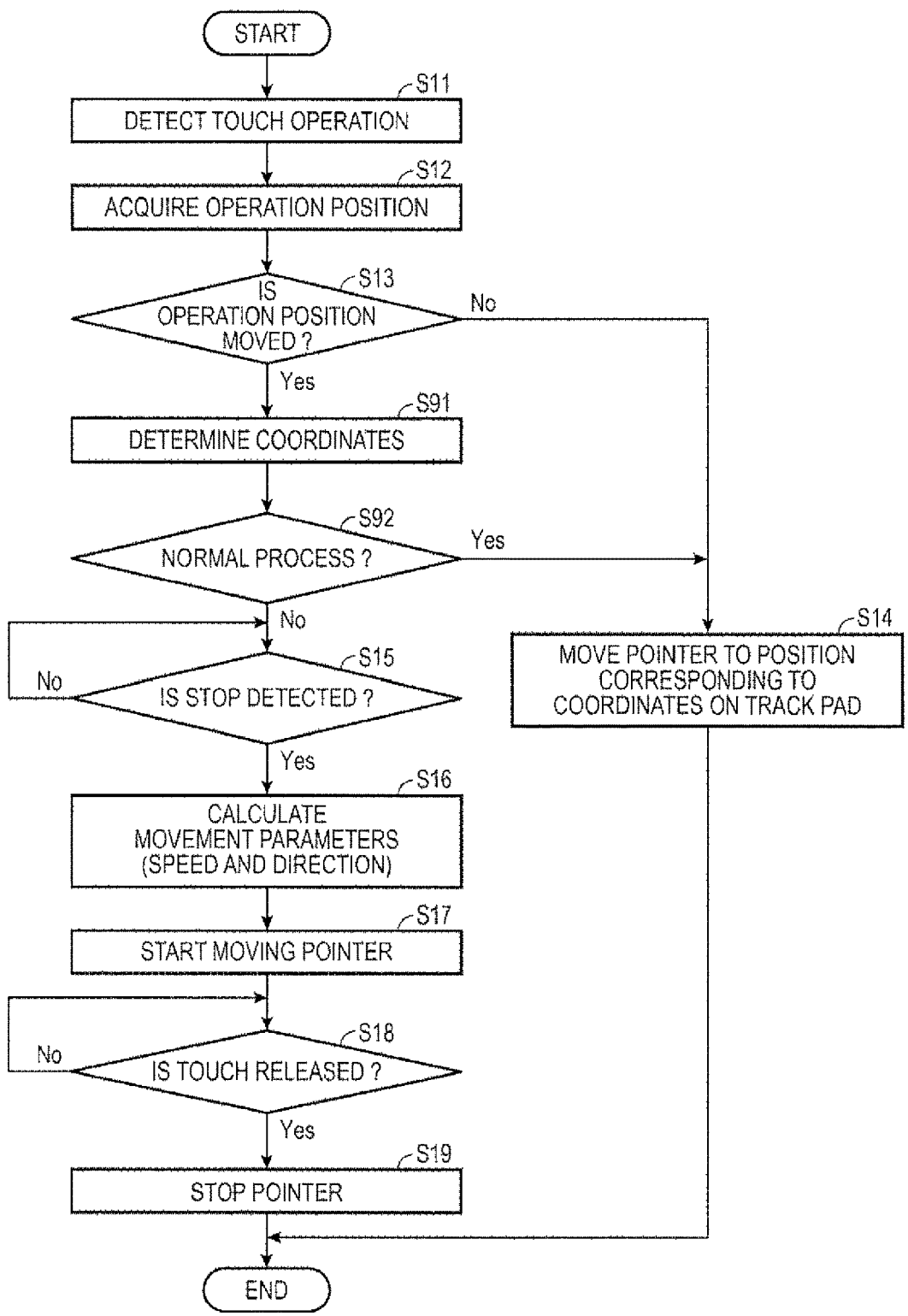
FIG. 17 is a flowchart illustrating an operation of an HMD according to the sixth embodiment.

FIG. 16 is a diagram illustrating a setting state of an operation region on the track pad 14 according to a sixth embodiment to which the invention is applied. FIG. 17 is a flowchart illustrating an operation of the HMD 100. In the sixth embodiment, the configuration of the HMD 100 is the same as that of the first embodiment. Therefore, the configuration of the HMD 100 is not illustrated and the description thereof will be omitted.

As illustrated in FIG. 16, in the sixth embodiment, a plurality of operation regions C are set in the track pad 14. The operation regions C are designated by coordinates on the track pad 14 and the coordinates of the boundaries between the operations regions C and other regions are formed in, for example, the setting data 121.

As described in the first and second embodiments, the operation region C1 is a region which is a control target in which the pointer P is moved even while the operation position of the track pad 14 is not moved. In contrast, a region other than the operation region C1, that is, an operation region C2, is a region in which the display position of the pointer P in the displayable region D is controlled to correspond to the operation position on the track pad 14.

The control unit 140 performs the process described in the first embodiment in a case in which a slide gesture is performed in the operation region C1. In the operation region C2, a normal process of moving the pointer P to a position corresponding to the operation position on the track pad 14 is performed even when the slide gesture is performed. This operation is illustrated in FIG. 17.

Steps S11 to S19 of the operation illustrated in FIG. 17 are the same as those of the foregoing first embodiment.

In the sixth embodiment, in a case in which the operation on the track pad 14 is determined to be the slid gesture (Yes in step S13), the control unit 140 of the HMD 100 determines the coordinates of the operation position (step S91). In step S91, for example, it is determined whether the operation position is included in the operation region C1 by comparing the coordinates of the operation position on the track pad 14 to the coordinates set in the setting data 121.

Based on the determination result of step S91, the control unit 140 determines whether the normal process is performed (step S92). In a case in which the normal process is performed (Yes in step S92), the process proceeds to step S14. Then, the pointer P is moved to the display position of the displayable region D corresponding to the operation position on the track pad 14 (step S14) and the present process ends.

In a case in which the normal process is not performed (No in step S92), the control unit 140 allows the process to proceed to step S15.

According to an operation of the sixth embodiment, the process of moving the pointer P greater than a movement amount of an actual operation position on the track pad 14 can be performed only in a specific region on the track pad 14. A region which is the processing target on the track pad 14 is not limited to the shape and the size of the operation region C1 exemplified in FIG. 16. For example, the track pad 14 may be divided into a plurality of regions vertically or horizontally and one of the regions may be set as the same region as the operation region C1. In a case in which the shape of the track pad 14 is elongated in the X or Y direction or in a case in which the track pad 14 with a relatively large area can be mounted, it is effective in that unnecessary movement of the pointer P can be avoided.

Seventh Embodiment

Figure 18:
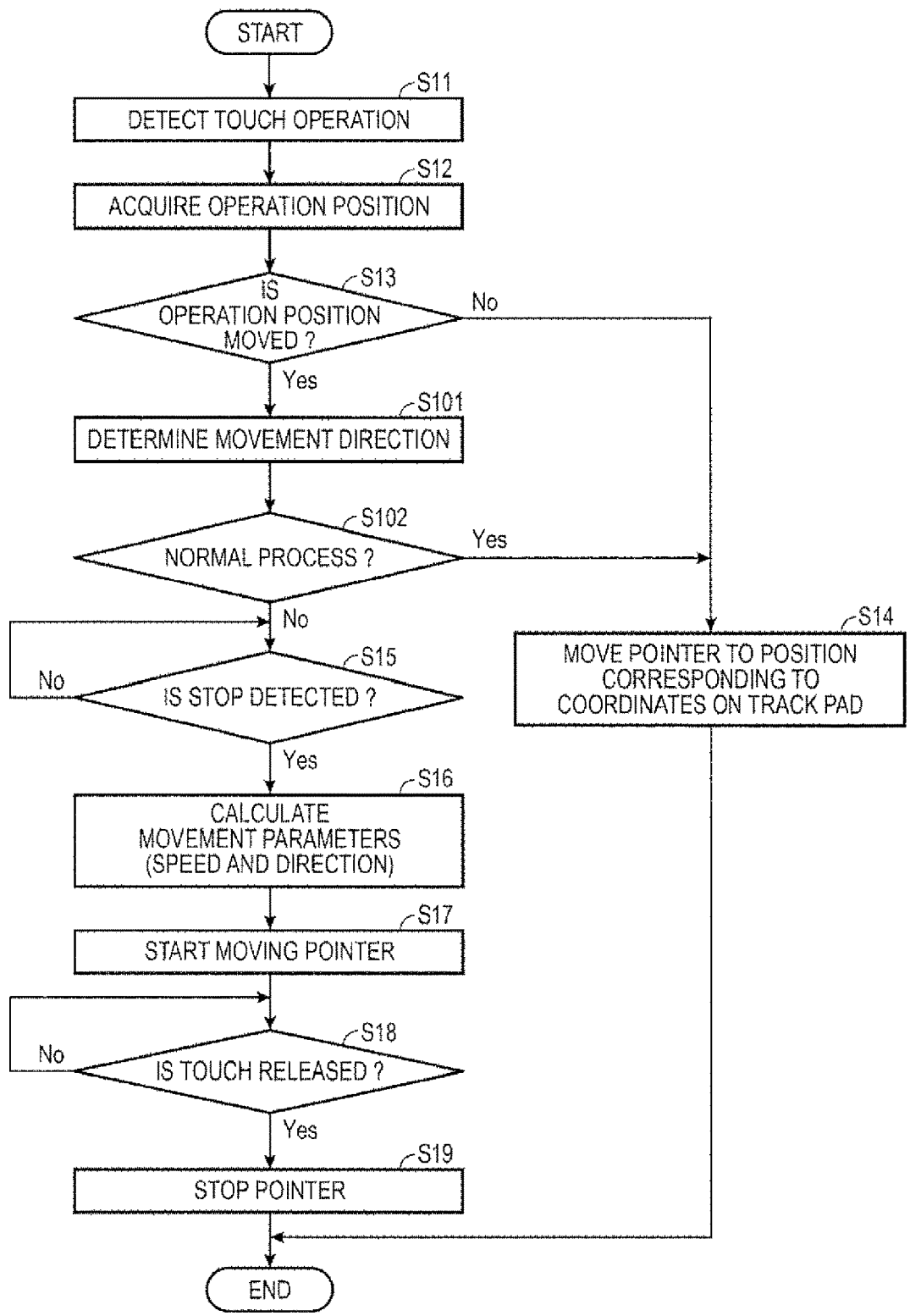
FIG. 18 is a flowchart illustrating an operation of an HMD according to a seventh embodiment.

FIG. 18 is a flowchart illustrating an operation of the HMD 100 according to a seventh embodiment to which the invention is applied. In the seventh embodiment, the configuration of the HMD 100 is the same as that of the first embodiment. Therefore, the configuration of the HMD 100 is not illustrated and the description thereof will be omitted.

Steps S11 to S19 of the operation illustrated in FIG. 18 are the same as those of the foregoing first embodiment.

In the seventh embodiment, the control unit 140 of the HMD 100 performs the process described in the first embodiment in response to an operation of moving an operation position in a specific direction in a slide gesture on the track pad 14. In a case in which the movement direction of the operation position is not a set direction even when the slide gesture is performed, the normal process of moving the pointer P to a position corresponding to the operation position on the track pad 14 is performed.

That is, in a case in which the control unit 140 of the HMD 100 determines that an operation on the track pad 14 is a slide gesture (Yes in step S13), the control unit 140 determines a movement direction of the operation position (step S101).

The control unit 140 determines whether the normal process is performed based on the movement direction determined in step S101 (step S102). In a case in which the normal process is performed (Yes in step S102), the process proceeds to step S14. Then, the pointer P is moved to the display position of the displayable region D corresponding to the operation position on the track pad 14 (step S14) and the present process ends.

In a case in which the normal process is not performed (No in step S102), the control unit 140 allows the process to proceed to step S15.

According to an operation of the seventh embodiment, the process of moving the pointer P greater than a movement amount of an actual operation position on the track pad 14 can be performed only on an operation in a specific direction on the track pad 14. For example, the slide gesture in the Y direction may be set as the processing target and the normal process may be performed in response to the slide gesture in the X direction. In this case, it is effective in a case in which the track pad 14 has a shape which is horizontally long in the X direction. That is, only in a direction in which it is difficult to ensure a movement amount of the operation position, for example, in a case in which the shape of the track pad 14 has a shape which is long in the X direction or the Y direction, the foregoing process can be performed.

It is determined in step S42 whether the direction determined in step S41 corresponds to the set direction. However, in this determination, the invention is not limited to the case in which the pointer is moved exactly in a specific direction, but a range regarded as the specific direction may be set. That is, in a case in which the range of the direction in which the foregoing process is performed is preset and the movement direction of the operation position is included in the range, the determination may be negative in step S42.

Eighth Embodiment

Figure 19:
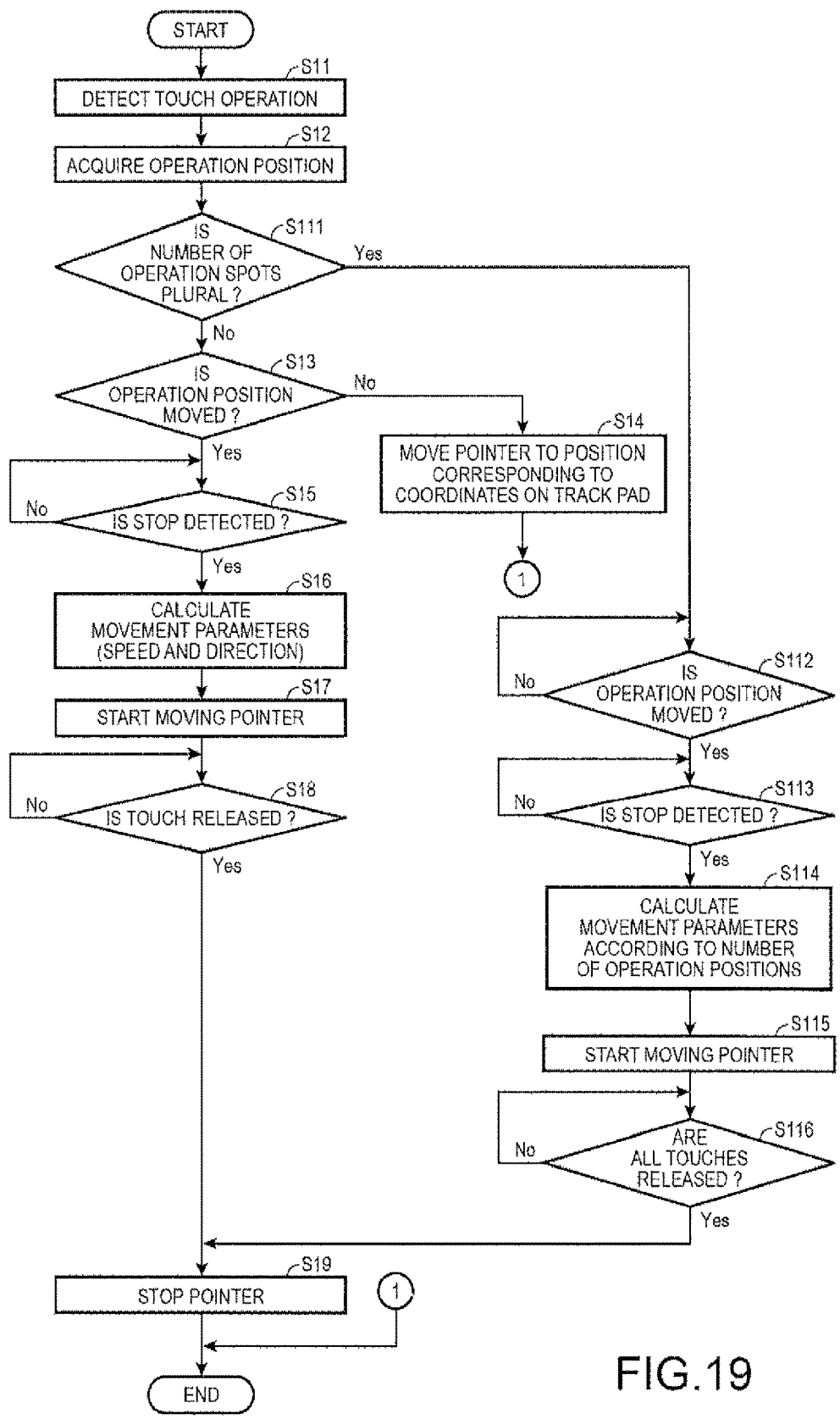
FIG. 19 is a flowchart illustrating an operation of an HMD according to an eighth embodiment.
Figure 20:
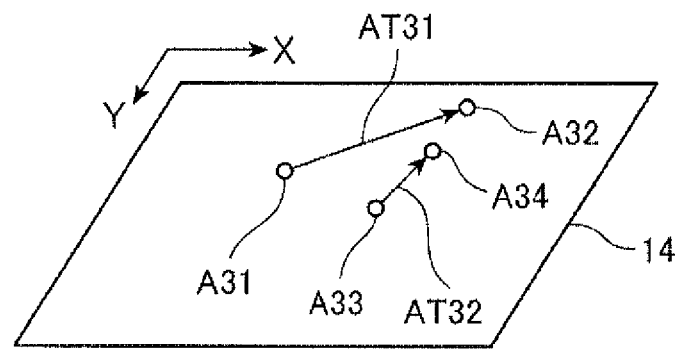
FIG. 20 is a schematic diagram illustrating correspondence between a track pad and a virtual input plane.
Figure 20:
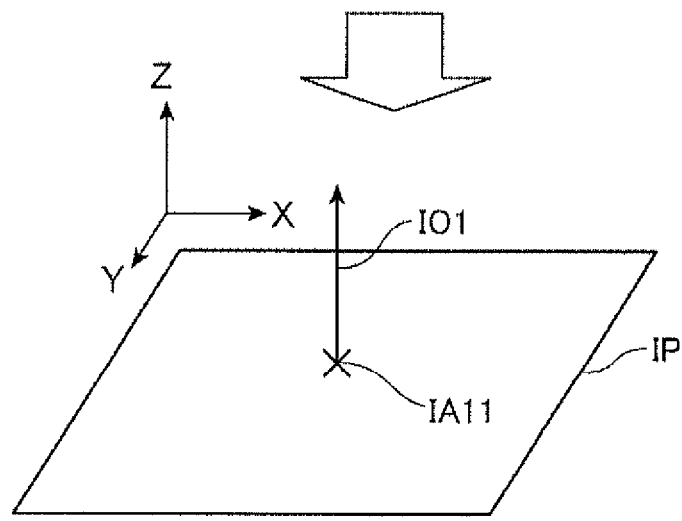

FIG. 19 is a flowchart illustrating an operation of the HMD 100 according to an eighth embodiment to which the invention is applied. FIG. 20 is a schematic diagram illustrating correspondence between the track pad 14 and the virtual input plane IP according to the eighth embodiment. In the eighth embodiment, the configuration of the HMD 100 is the same as that of the first embodiment. Therefore, the configuration of the HMD 100 is not illustrated and the description thereof will be omitted.

In the eighth embodiment, in a case in which an operation of touching the track pad 14 at a plurality of positions is performed, the HMD 100 performs a process according to a touch operation at the plurality of positions.

Steps S11 to S19 of the operation illustrated in FIG. 19 are the same as those of the foregoing first to third embodiments.

In the eighth embodiment, the control unit 140 acquires the operation position on the track pad 14 detected by the input information acquisition unit 110 (step S12) and determines whether the number of acquired operation positions is plural (step S111). When the number of operation positions is 1 (No in step S111), the control unit 140 allows the process to proceed to step S13.

In a case in which the number of operation positions is plural (Yes in step S111), the control unit 140 determines whether the operation position is moved (step S112). While the operation position is not moved (No in step S112), the control unit 140 waits until movement of the operation position. While the control unit 140 waits, the control unit 140 continuously detects the operation position based on the operation data input from the input information acquisition unit 110. In step S112, the control unit 140 determines that the operation position is moved in a case in which at least one of the plurality of operation positions is moved.

In a case in which the control unit 140 determines that the operation position is moved (Yes in step S112), the control unit 140 determines whether the operation position is stopped (step S113). While the operation position is not stopped (No in step S113), the control unit 140 waits until the operation position stopped. While the control unit 140 waits, the control unit 140 continuously detects the operation position based on the operation data input from the input information acquisition unit 110.

When the operation position is stopped (Yes in step S113), the control unit 140 calculates the movement parameters of the input data according to the number of operation positions and the movement of the operation position (step S114). The movement parameters of the input data include, for example, data indicating a starting position of the movement of the input position, a movement direction of the input position, and a movement speed of the input position.

The control unit 140 starts generating the input data according to the movement parameters set in step S16 and starts a process of causing the right display driving unit 22 and the left display driving unit 24 to display the pointer P based on the generated input data (step S115). By moving the input position of the input data generated by the control unit 140, the display position of the pointer P displayed by the image display unit 20 is moved. Thereafter, the control unit 140 continues the process of generating the input data at a predetermined period (for example, a sampling period of the input information acquisition unit 110). The control unit 140 continues a process of moving the display position of the pointer P based on the generated input data.

While the display position of the pointer P is moved, the control unit 140 monitors releasing of the touch on the track pad 14 (step S116). In step S116, the control unit 140 determines whether all the touches on the track pad 14 are released. In a case in which the control unit 140 determines that the touch on the track pad 14 is not released (No in step S116), the control unit 140 continuously monitors the touch position in step S116 and continues the generation of the input data and the movement of the display position of the pointer P.

When the control unit 140 detects that all the touches on the track pad 14 are released (Yes in step S116), the control unit 140 stops generating the input data, accordingly stops the movement of the pointer P (step S19), and ends the present process.

In step S114, the control unit 140 may generate the movement parameters based on the movement direction, the speed, and the movement amount of each of the plurality of operation positions. The control unit 140 may obtain changes in the relative positions of the plurality of operation positions and generate the movement parameters based on the directions of the changes in the relative positions, the speeds of the changes, and the change amounts.

Examples of specific operations of the control unit 140 in step S114 can be exemplified as follows.

(1) In a case in which some operation positions are moved among the plurality of operation positions, the control unit 140 sets the unmoved operation positions as detection targets. In this case, in a case in which the operation positions set as the detection targets are moved, the control unit 140 generates the movement parameters corresponding to movement directions, movement speeds, and movement amounts of the detection target operation positions as in, for example, the process of step S16. In a case in which the operation of (1) is performed, the control unit 140 sets one operation position as a detection target operation position. Accordingly, in a case in which the input information acquisition unit 110 detects three or more operation positions, the control unit 140 waits until the other operation positions excluding any one operation position are moved in step S112. Further, the control unit 140 waits in step S112 until the detection target operation positions are moved after the detection target operation positions are set.

In contrast to this, the control unit 140 may sets the moved operation positions as the detection targets in a case in which some operation positions are moved among the plurality of operation positions. In this example, in a case in which the input information acquisition unit 110 detects three or more operation positions, the control unit 140 waits until any one operation position is moved in step S112. Further, the control unit 140 waits in step S112 until the detection target operation positions are moved after the detection target operation positions are set.

(2) In a case in which the plurality of operation positions are moved and a case in which the movement directions of the plurality of operation positions are parallel to each other, the control unit 140 generates the movement parameters so that the input data in which the images displayed by the image display unit 20 are expanded/contracted are generated. For example, this case corresponds to a case in which the user moves a plurality of fingers on the track pad 14 with the fingers aligned. In this case, the control unit 140 may add data indicating the input data giving an instruction to expand or contract the display images as attributes of the movement parameters. The input data generated by the control unit 140 may be data giving an instruction to expand or contract the display images, a display magnification may be designated, or data giving an instruction to increase/decrease a display magnification. The display control unit 170 updates the display magnification of the display image (for example, the pointer P) displayed by the right display driving unit 22 and the left display driving unit 24 according to the generated input data.

(3) In a case in which the plurality of operation positions are moved and a case in which the movement directions of the plurality of operation positions are not parallel to each other, the control unit 140 may perform a process of generating the input data in the Z axis direction (which is a direction vertical to the virtual input plane IP) of the virtual input plane IP in which the X-Y coordinates are set.

In this case, the control device 10 including the operating system 150 is configured to receive a three-dimensional position input. The control device 10 can detect a position input for which a direction vertical to the virtual input plane IP is set as a coordinate axis, using a two-dimensional position input in the virtual input plane IP and the virtual input plane IP as references. That is, it is possible to perform a process of receiving the X-Y coordinates in the virtual input plane IP and a position input in the Z axis direction vertical to the virtual input plane IP. That is, the control device 10 has a virtual input space including the virtual input plane IP and can process the input data in which a position or a direction in the virtual input space are decided, using the virtual input plane IP as a reference.

FIG. 20 illustrates an example in which an operating body touches an operation position A31 and an operation position A33 on the track pad 14, an operation AT31 of moving the operating body from the operation position A31 to an operation position A32 is performed, and an operation AT32 of moving the operating body from the operation position A33 to an operation position A34 is performed. In the operations AT31 and AT32, two operation positions on the track pad 14 are moved so that the operation positions are close to each other.

The control unit 140 generates the movement parameters to generate input data in which the input positions are moved in the Z axis direction on the virtual input plane IP in correspondence to the fact that the two operation positions are closed through the operations AT31 and AT32. In the example of FIG. 20, input data in which the input position is moved in the positive direction of the Z axis on the virtual input plane IP is generated. In a case in which an operation of expanding a distance between two operation positions on the track pad 14 is detected, the control unit 140 may generate input data in which the input position on the virtual input plane IP is moved in the negative direction of the Z axis. In the case, a base point of the input position moved in the Z axis direction may be set to a center of the plurality of operation positions or an input position IA11 corresponding to the center of gravity.

The example of (3) can be combined with the case in which the plurality of operation positions are moved, as described in (2). In this case, the movement parameters may be set so that input data in which the display image is expanded/contracted may be generated in a case in which the operation positions are moved in parallel, and input data in which the input positions are moved in the Z axis direction on the virtual input plane IP is generated in a case in which the distances of the plurality of operation positions are changed. The movement parameters maybe set so that input data in which inputs positions are moved in the Z axis direction on the virtual input plane IP is generated in correspondence to the movement directions and the movement amounts of the plurality of operation positions in a case in which the plurality of operation positions are moved in parallel. The movement parameters may be set so that input data in which the display image is expanded/contracted is generated in a case in which the plurality of operation positions are moved horizontally and input data in which the input positions are moved in the Z axis direction is generated in a case in which the plurality of operation positions are moved non-horizontally, that is, the mutual distances are changed.

(4) In a case in which three or more operation positions are simultaneously moved, the control unit 140 may perform a process of generating input data in the Z axis direction (which is a direction vertical to the virtual input plane IP) of the virtual input plane IP in which the X-Y coordinates are set in correspondence to movement of the three or more operation positions. In this case, the control unit 140 performs a calculation process, such as a process of obtaining an average, on at least one of the movement directions, the movement speeds, and the movement amounts of the plurality of operation positions and obtains a representative value of the movement directions, the movement speeds, or the movement amounts of the operation positions. The control unit 140 may generate the movement parameters based on the representative value. In this case, the control unit 140 can generate input data in which the input positions are moved in the positive direction or the negative direction of the Z axis on the virtual input plane IP.

The control unit 140 can perform at least one operations of the above-described (1), (2), (3), and (4) or an operation in which two or more operations are combined in step S114. Accordingly, it is possible to perform complex input operations through touch operations on the track pad 14 in response to various operations on the track pad 14.

Ninth Embodiment

Figure 21:
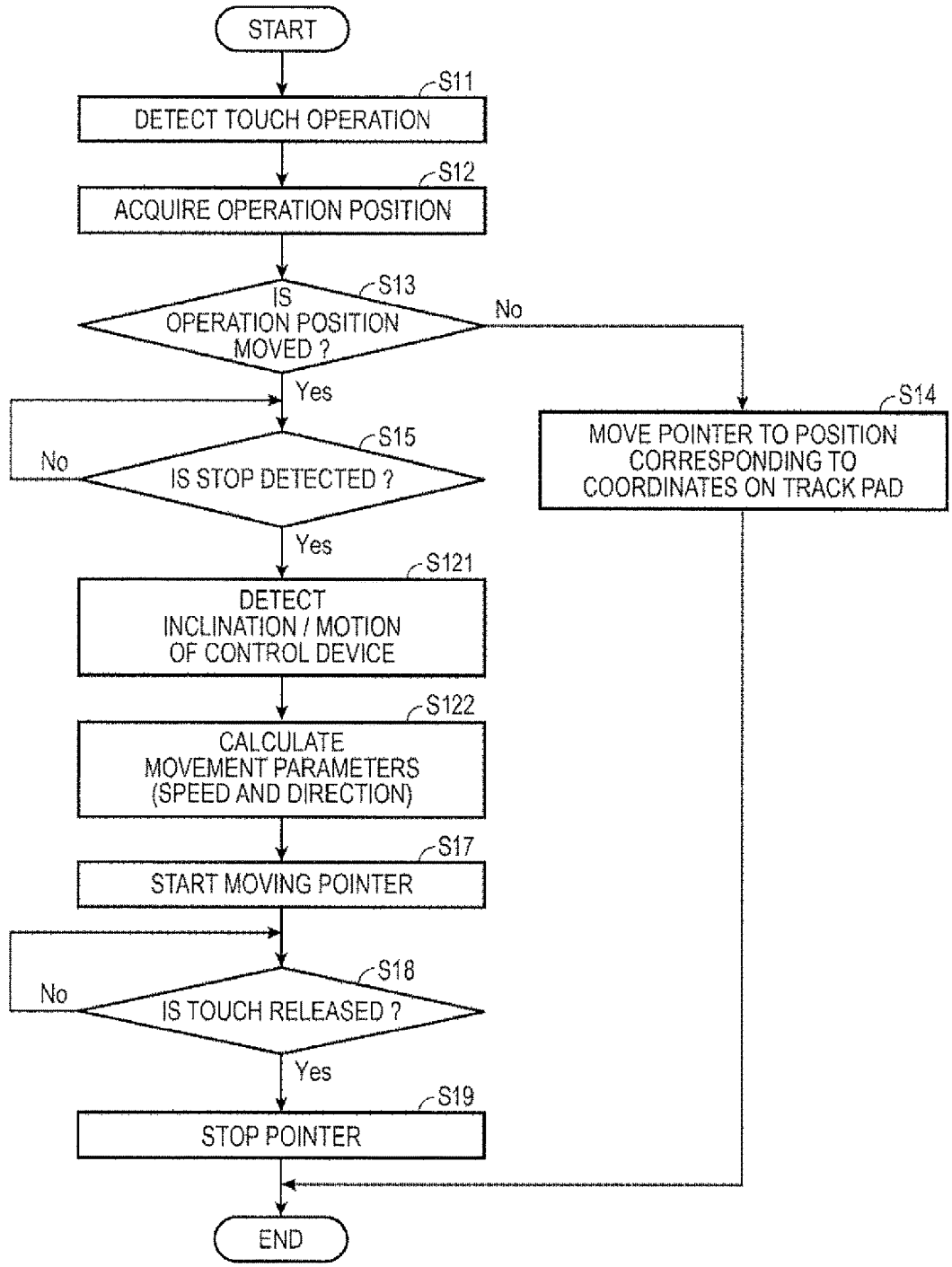
FIG. 21 is a flowchart illustrating an operation of an HMD according to a ninth embodiment.

FIG. 21 is a flowchart illustrating an operation of the HMD 100 according to a ninth embodiment to which the invention is applied. In the ninth embodiment, the configuration of the HMD 100 is the same as that of the first embodiment. Therefore, the configuration of the HMD 100 is not illustrated and the description thereof will be omitted.

In the ninth embodiment, the HMD 100 generates input data according to a touch operation on the track pad 14 and an operation of moving the control device 10 or changing the posture of the control device 10.

Steps S11 to 519 of the operation illustrated in FIG. 21 are the same as those of the above-described first to third embodiments.

In a case in which the control unit 140 detects that the operation position is stopped (step S15), the control unit 140 detects an inclination of the control device 10 and/or a motion of the control device 10 based on the detection value of the tri-axial sensor 113 (step S121). After the input information acquisition unit 110 detects a touch operation in step S11, the control unit 140 may acquire a detection value of the tri-axial sensor 113, for example, at a set sampling period and may specify the posture of the control device 10 based on an accumulative value of the detection values. After the control unit 140 detects in step S13 that the operation position is moved, the control unit 140 may acquire a detection value of the tri-axial sensor 113, for example, at a set sampling period and may specify the posture of the control device 10 based on an accumulative value of the detection values. In a case in which the control device 10 includes a geomagnetic sensor (not illustrated), the control unit 140 may detect the posture of the control device 10 based on a detection value of the geomagnetic sensor. The control unit 140 may acquire the detection value of the tri-axial sensor 113 in step S121 and detect the posture of the control device 10 based on the acquired detection value.

The control unit 140 calculates the movement parameters in correspondence to the inclination of the control device 10 and/or the motion of the control device 10 detected in step S121 and the operation position detected in steps S12 to S15 (step S122). In step S122, the control unit 140 may include the data indicating the starting position of the movement of the input position, the movement direction of the input position, and the movement speed of the input position. The movement parameters may include the data indicating the movement amount. The movement parameters may be data for generating the input data including movement of the input position in the direction vertical to the virtual input plane IP.

In step S122, for example, the control unit 140 may generate the movement parameters based on the trajectory, the movement speed, the movement direction, the movement amount, or the like of the operation position on the track pad 14. Further, the control unit 140 may correct or amend the generated movement parameters based on the inclination (posture) of the control device 10 and/or the motion of the control device 10 detected in step S121. Specifically, for example, in a case in which the control unit 140 detects in step S121 that the control device 10 is inclined in a preset direction, the control unit 140 may update the data indicating the movement speed of the input position in the movement parameters. In this case, in a case in which the control device 10 is inclined in a predetermined direction, the control unit 140 may update the movement parameters so that the movement speed of the input position is increased. In a case in which the control device 10 is inclined in an opposite direction to the predetermined direction, the control unit 140 may update the movement parameters so that the movement speed of the input position is decreased. Alternatively, in a case in which the control device 10 is moved in a predetermined direction, the control unit 140 may update the movement parameter so that the movement speed of the input position is increased. In a case in which the control device 10 is moved in an opposite direction to the predetermined direction, the control unit 140 may update the movement parameters so that the movement speed of the input position is decreased.

The control unit 140 may change relative positions of the track pad 14 and the virtual input plane IP in correspondence to the inclination of the control device 10. For example, in an initial state, as illustrated in FIG. 6, the track pad 14 is set to be parallel to the virtual input plane IP, and the X-Y axes of the track pad 14 is set to be parallel to the X-Y axes of the virtual input plane IP. The control unit 140 may change the inclination of the virtual input plane IP with respect to the track pad 14 according to the inclination of the control device 10 detected in step S121.

In this way, the HMD 100 includes the tri-axial sensor 113 that detects the posture of the control device 10 including the track pad 14 or the change in the posture. The control unit 140 generates the input data in response to the posture of the control device 10 or the change in the posture detected by the tri-axial sensor 113 while the display position of the pointer P is move. Accordingly, the control unit 140 changes at least one of the movement direction and the movement speed of the display position of the pointer P. Therefore, it is possible to control the form of the movement of the display position of the pointer P which is the display object through a simple operation with the high degree of freedom.

Other Modification Examples

Hereinafter, modification examples of the foregoing embodiments will be described with reference to FIGS. 22 to 25.

Figure 22:
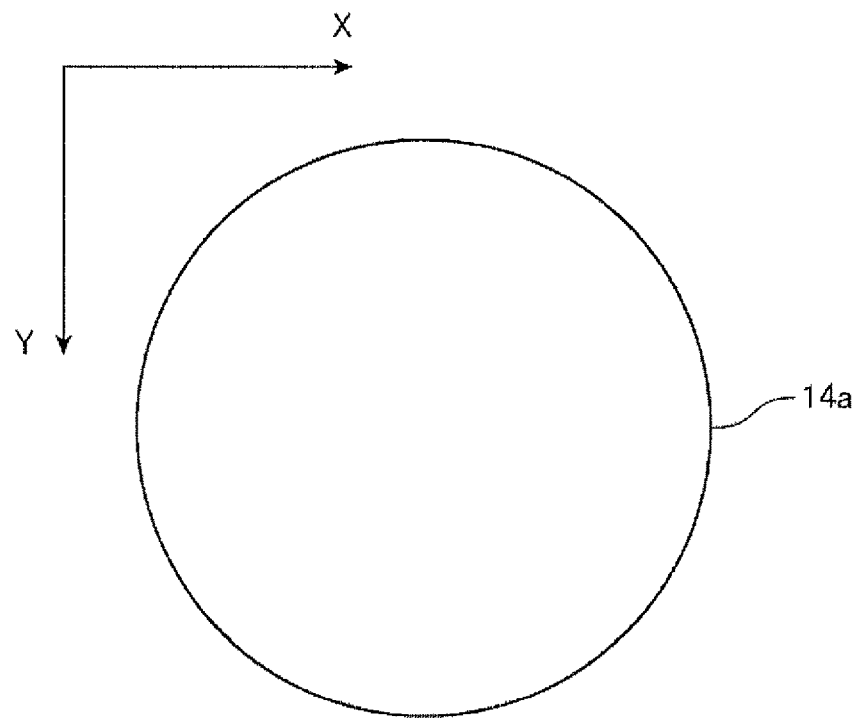
FIG. 22 is a diagram illustrating a modification example of the embodiment of the invention.

FIG. 22 is a diagram illustrating a circular track pad 14*a* as a modification example of the track pad 14. The track pad 14*a* functions as an operation surface on which a touch operation is detected, as in the track pad 14. In a case in which the HMD 100 includes the track pad 14*a*, the input information acquisition unit 110 detects an operation on the track pad 14*a*, for example, at coordinates of the rectangular coordinate system denoted by the signs X and Y axes in FIG. 22. On the track pad 14*a*, an operation position is not considerably movable in the X axis direction and the Y axis direction. However, by applying the foregoing first to ninth embodiments, it is possible to move the pointer P greater than a movement amount of the operation position on the track pad 14. The track pad 14*a* may have s size in which a direction of movement of the operation position can be detected by the control unit 140, as in the track pad 14. Therefore, as illustrated in FIG. 22, the track pad 14*a* may have a different shape from the display region of the image display unit 20.

Accordingly, the circular track pad 14*a* illustrated in FIG. 22 or any of track pads having various shapes such as a long and thin shape can be used to considerably move the pointer P, and thus it is possible to realize high operability.

Figure 23:
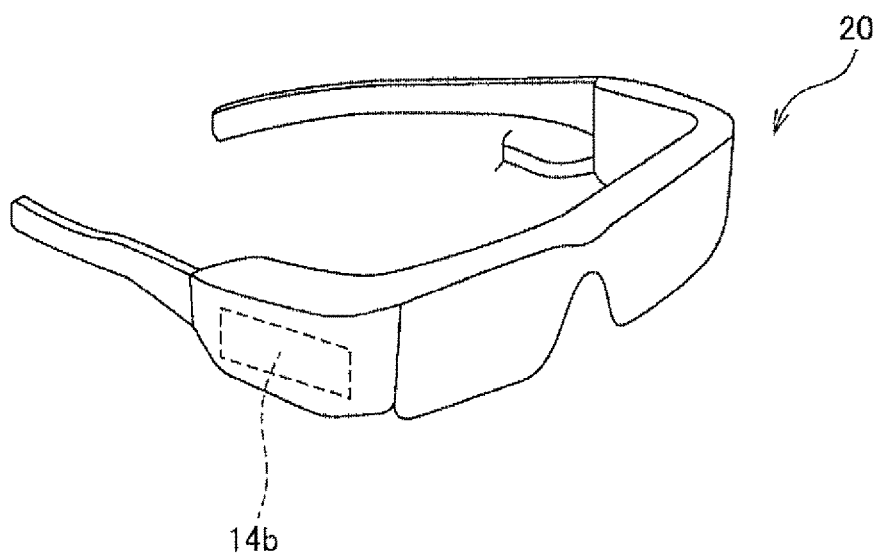
FIG. 23 is a diagram illustrating a modification example of the embodiment of the invention.

FIG. 23 illustrates a modification example in which a track pad 14*b* is disposed on a side surface of the image display unit 20 instead of the track pad 14 (see FIG. 1) formed in the body of the control device 10. The track pad 14*b* functions as an operation surface on which a touch operation is detected, as in the track pad 14.

In the example of FIG. 23, a user can perform a slide gesture through an operation of rubbing the side surface of the image display unit 20 with his or her finger. Even in this case, it is not easy to enlarge the area of the track pad 14*b*. However, by applying the foregoing first to ninth embodiments, it is possible to realize high operability.

Figure 24:
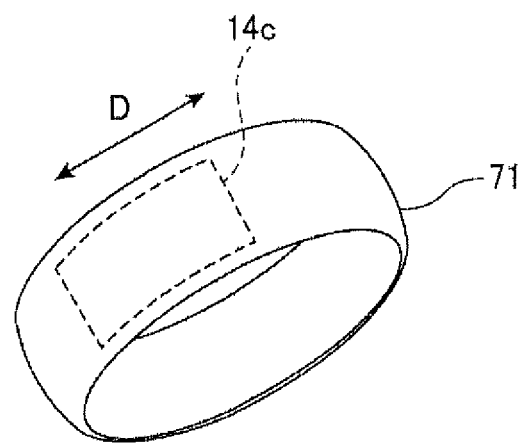
FIG. 24 is a diagram illustrating a modification example of the embodiment of the invention.

FIG. 24 illustrates an example in which a track pad 14*c* on which a touch operation can be detected as in the track pad 14 is disposed on the surface of a ring type device 71. The track pad 14*c* functions as an operation surface on which a touch operation is detected, as in the track pad 14.

The track pad 14*c* is formed in a part of the surface or the entire surface of the device 71. The exterior shape of the track pad 14*c* can be configured to be integrated with the surface of the device 71. On the track pad 14*c*, a touch on the surface of the device 71 may be detectable. A circuit and the like detecting a touch may be configured to be embedded or accommodated inside the device 71. That is, the surface of the device 71 may not be configured to be integrated with the circuit and the like detecting an operation or a part of the circuit may not be configured.

The device 71 can be configured to perform, for example, wireless communication with the communication unit 117 of the control device 10 and the control unit 140 is able to detect an operation position on the track pad 14*c*.

In this case, by applying the foregoing first to ninth embodiments, it is possible to freely move the pointer P through a touch operation on the small ring type device 71.

Figure 25:
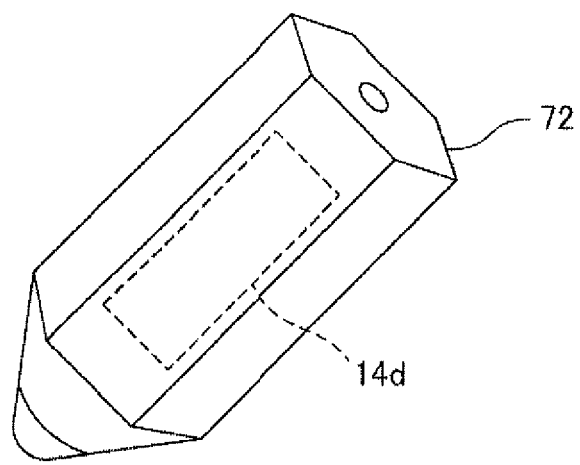
FIG. 25 is a diagram illustrating a modification example of the embodiment of the invention.

FIG. 25 illustrates an example in which a track pad 14*d* on which a touch operation can be detected as in the track pad 14 is disposed on a side surface of a pen type device 72. The track pad 14*d* functions as an operation surface on which a touch operation is detected, as in the track pad 14. The track pad 14*d* is formed in a part of the surface or the entire surface of the device 72. The exterior shape of the track pad 14*d* can be configured to be integrated with the surface of the device 72. On the track pad 14*d*, a touch on the surface of the device 72 may be detectable. A circuit and the like detecting a touch may be configured to be embedded or accommodated inside the device 72. That is, the surface of the device 72 may not be configured to be integrated with the circuit and the like detecting an operation or a part of the circuit may not be configured.

The device 72 can be configured to perform, for example, wireless communication with the communication unit 117 of the control device 10 and the control unit 140 is able to detect an operation position on the track pad 14*d*. The device 72 may have a configuration which can be used actually as a writing instrument. By applying the foregoing first to ninth embodiments to the configuration in which the device 72 is used, it is possible to freely move the pointer P through a touch operation on the small pen type device 72.

An operation on the track pad 14*c* or 14*d* is, for example, a touch operation with a finger or the like and an operation of moving a finger with the touched finger maintained. In a case in which a touch on the track pad 14*c* or 14*d* is detected, the control unit 140 determines that an operation does not end while the touch is maintained, that is, until the touch is released. In other words, when the touch of the finger on the track pad 14*c* or 14*d* is released, the operation is determined to end. Accordingly, in a case in which a user performs an operation of touching and moving his or her finger on the track pad 14*c* or 14*d*, the pointer P which is a display object or the display positions of the screens M1 to M6 are moved until the user detaches his or her finger from the track pad 14*c* or 14*d*.

As another example of the configuration in which the surface of a three-dimensional object is set as an operation surface, for example, the surface of a handle of an automobile can be set as an operation surface and a touch operation on the surface of the handle is detected.

The operation surfaces of the track pads 14, 14*a*, 14*b*, 14*c*, and 14*d* described in the foregoing embodiments can also be divided into a plurality of regions and the regions can be used as operation surfaces. In this case, the control unit 140 may set the movement parameters in response to movement of one operation position or a plurality of operation positions in each region, and generate the input data. The control unit 140 may set the movement parameters and generate the input data in response to movement of operation positions detected on the plurality of operation surfaces.

The invention is not limited to the foregoing embodiments and modification examples, but can be implemented in various forms within the scope of the invention without departing from the gist of the invention.

For example, in the foregoing embodiments, another type image display unit such as an image display unit mounted like a hat may be adopted instead of the image display unit 20. The image display unit may include a display unit that displays an image in correspondence to the left eye of a user and a display unit that displays an image in correspondence to the right eye of the user. The display apparatus according to the invention may be configured as, for example, a head-mounted display which is mounted on a vehicle such as an automobile, an airplane, or the like. For example, the display apparatus may be configured as a head-mounted display embedded in a body protection instrument such as a helmet or may be configured as a head-up display (HUD) used in a front glass of an automobile.

In the foregoing embodiments and modification examples, the pointer P or the screens M1 to M6 in the ring type UI illustrated in FIG. 8 have been exemplified as a display object. The invention is not limited thereto. A display object can be applied in the invention as long as the display position can be moved in response to an operation on the operation surface. For example, the invention may be applied using a display object displayed in an application program or content such as a game executed by the control device 10 as a display object.

Further, in the foregoing embodiments, the configuration in which the image display unit 20 and the control device 10 are separated and are connected via the connection unit 40 has been described as an example. However, the control device 10 and the image display unit 20 can also be configured to be integrated to be mounted on the head of a user.

For example, as the configuration in which image light is generated in the image display unit 20, a configuration in which an organic electro-luminescence (EL) display and an organic EL control unit are included may be used. As the configuration in which the image light is generated, a liquid crystal on silicon (LCoS: registered trademark), a digital micro mirror device, or the like can used. For example, the invention can also be applied to a laser retina projection type head-mounted display. That is, a configuration may also be adopted in which the image generation unit may include a laser light source and an optical system that guides laser light source to the eyes of a user, the laser light is incident on the eyes of the user to be scanned on the retinas of the eyes of the user, and images are formed on the retinas, so that the user views the images. In a case in which the laser retina projection type head-mounted display is adopted, "an image light emittable region in the image light generation unit" can be defined as an image region recognized by the eyes of the user.

As the optical system guiding the image light to the eyes of the user, a configuration in which an optical member transmitting outside light incident on an apparatus from the outside is included and the outside light is incident on the eyes of the user along with the image light can be adopted. An optical member which is located in front of the eyes of the user and overlaps a part of the view field or the entire view field of the user may also be used. A scanning type optical system that scans laser light or the like to form image light may also be adopted. An optical system is not limited to the optical system which image light is guided inside the optical member, but may have only a function of refracting and/or reflecting image light to guide the image light toward the eyes of the user.

The invention can also be applied to a display apparatus that uses an MEMS display technology by adopting a scanning optical system using an MEMS mirror. That is, a signal light forming unit, a scanning optical system that includes an MEMS mirror scanning light emitted by the signal light forming unit, and an optical member that forms a virtual image using light scanned by the scanning optical system may be included as image display elements. In this configuration, the light emitted by the signal light forming unit is reflected by the MEMS mirror, is incident on the optical member, is guided to the optical member, and arrives at a virtual formation surface. When the MEMS mirror scans light, a virtual image is formed on the virtual formation surface. Thus, when the user views the virtual image with his or her eyes, the user recognizes an image. In this case, optical components may be, for example, components that reflect light a plurality of times and guide the light, as in the right light-guiding plate 261 and the left light guiding plate 262 according to the foregoing embodiments, or half mirror surfaces may be used.

The display apparatus according to the invention is not limited to a head-mounted display apparatus, but the invention can be applied to various display apparatuses such as a flat panel display and a projector. The display apparatus according to the invention may enable a user to view an image using image light along with outside light. For example, a configuration in which an image is allowed to be view using image light by an optical member transmitting outside light can be exemplified. Specifically, the invention can be applied not only a configuration in which an optical member transmitting outside light is included in the foregoing head-mounted display but also to a display apparatus that projects image light to a flat surface or a curved surface (glass, transparent plastic, or the like) having a light transmission property and installed to be fixed or movable at a position distant from a user. For example, the configuration of a display apparatus that projects image light to a glass window of a vehicle and allows a user getting in the vehicle or a user outside the vehicle to view a scenery inside or outside the vehicle along with the image light can be exemplified. For example, the configuration of a display apparatus that projects image light a transparent, semi-transparent, or colored transparent display surface installed to be fixed, such as a glass window of a building, and allows a user near the display surface to view a scenery along with an image formed by the image light by allowing the user to see through the display surface can be exemplified.

The invention is not limited to the display apparatus that allows a user to view an image along with outside light, but can also be applied to various display apparatuses and can be applied to, for example, a display apparatus that displays an image so that an outside scenery is not viewable. Specifically, the invention can be applied to a display apparatus that displays an image captured by the camera 61, an image or CG generated based on the captured image, or a video based on video data stored in advance or video data input from the outside. Such a type of display apparatus can include a so-called closed type display apparatus that not allows a user to view an outside scenery. The invention can, of course, also be applied, as an application target, to a display apparatus that displays video data or an analog video signal input from the outside without performing a process such as AR display, MR display, or VR display.

At least some of the functional blocks illustrated in FIG. 2 may be implemented by hardware or may be implemented by cooperation of hardware and software. The invention is not limited to the configuration in which the independent hardware resources are disposed, as illustrated in FIG. 2. A program to be executed by the control unit 140 may be stored in the storage unit 120 or a storage device inside the control device 10. A program stored in an external apparatus may be acquired via the communication unit 117 or the interface 125 to be executed.

The invention can also be implemented in forms of a storage medium storing a program to be executed by the control device 10, a server apparatus delivering a program, a transmission medium transmitting the program, and a data signal embodying the program in carrier waves. The storage unit 120 which is a storage medium may be any one unit using a magnetic or optical storage medium and a semiconductor memory device, or any other kind of storage medium may be used. The storage medium may be a portable storage medium such as a memory card or any other specific implementation form may be used.

The program can be mounted as a single application program operating on the operating system 150 of the control device 10. The program may be mounted as the operating system 150, a part of the operating system 150, or as a device driver operating in cooperation with the operating system 150. Alternatively, the program may be mounted as a function of an application program to be executed along with the operating system or the device driver. For example, the program may be mounted as a function of a device driver program controlling the track pad 14, 14*a*, 14*b*, 14*c*, or 14*d*. The program may be mounted as a function of a program module receiving an operation on the track pad 14, 14*a*, 14*b*, 14*c*, or 14*d* in the operating system 150. The program may be implemented by a plurality of application programs or any specific program form may be used, The function of a program which is executed by the control unit 140, that is, each processing unit (for example, the image processing unit 160, the display control unit 170, the operation detection unit 183, the GUI control unit 185, the audio processing unit 190, or other generation units, determination unit, or specifying units) included in the control unit 140 may be configured using an application specific integrated circuit (ASIC) or a system on a chip (SoC) designed to implement the functions. The function may be implemented by a programmable device such as a field-programmable gate array (FPGA).

In the configuration formed in the control device 10, only the operation unit 111 may be formed as a single user interface (UI). The configuration formed in the control device 10 may be overlapped to be formed in the image display unit 20. For example, the control unit 140 illustrated in FIG. 2 may be formed in both of the control device 10 and the image display unit 20. Functions performed by CPUs formed in the image display unit 20 and the control unit 140 formed in the control device 10 may be independently separated.

The entire disclosure of Japanese Patent Application No. :2015-097943, filed May 13, 2015 and 2016-041864, filed Mar. 4, 2016 are expressly incorporated by reference herein.

What is claimed is:

1. A display apparatus comprising:
   a display unit;
   an operation detection unit that detects an operation on an operation surface; and
   a control unit that causes the display unit to display an operation target display object and controls a display position of the display object in response to an operation on the operation surface,
   wherein the control unit moves the display position of the display object in response to a change in an operation position on the operation surface detected by the operation detection unit and stops moving the display position of the display object in a case in which the operation detection unit detects an operation corresponding to a preset ending condition,
   wherein the operation surface is in a separate housing spaced from a housing of the display unit, and
   wherein the control unit detects the operation position in a case in which the operation detection unit detects a touch of an operation body on the operation surface, and the control unit determines that the operation corresponds to the ending condition in a case in which the operation detection unit detects that the touch is released, and then a predetermined time passes after a detection is made that the touch is released and no further touching is detected.

2. The display apparatus according to claim 1,
   wherein the control unit sets a movement direction of the display position of the display object to a direction corresponding to a movement direction of the operation position on the operation surface.

3. The display apparatus according to claim 2,
   wherein after the operation detection unit detects an operation on the operation surface, the control unit displays the display object at the display position corresponding to the operation position of the operation surface while a process of obtaining a movement direction of the display position of the display object is performed.

4. The display apparatus according to claim 1,
   wherein the control unit sets a movement speed of the display position of the display object to a speed corresponding to a movement amount or a movement speed of the operation position on the operation surface.

5. The display apparatus according to claim 1,
   wherein the control unit changes at least one of a movement speed and a movement direction of the display position of the display object in a case in which the operation position on the operation surface detected by the operation detection unit is changed during movement of the display position of the display object.

6. The display apparatus according to claim 1,
   wherein the control unit changes at least one of a movement speed and a movement direction of the display position of the display object in response to an operation position of a new touch detected by the operation detection unit in a case in which the operation detection unit detects that the touch is released, and then the operation detection unit detects the touch on the operation surface within the predetermined time.

7. The display apparatus according to claim 1, further comprising:
   an operation device that has the operation surface; and
   a posture detection unit that detects a posture of the operation device or a change in the posture,
   wherein the control unit changes at least one of a movement speed and a movement direction of the display position of the display object in response to the posture of the operation device or the change in the posture detected by the posture detection unit during movement of the display position of the display object.

8. The display apparatus according to claim 1,
   wherein an area or a size in which the operation detection unit detects an operation on the operation surface is less than an area or a size of a display region in which an image is displayed by the display unit.

9. The display apparatus according to claim 1,
wherein a shape of the operation surface is a different shape from a display region in which an image is displayed by the display unit.

10. The display apparatus according to claim 1,
wherein the display apparatus is a head mounted display, the housing of the display unit is configured to be mounted on a user's head such that the display unit is in front of the user's eyes, and the operation surface is in a control device.

11. A display apparatus comprising:
a display unit;
an operation detection unit that detects an operation on an operation surface; and
a control unit that generates input data on a virtual input plane according to an operation detected by the operation detection unit,
wherein the control unit starts generating the input data on the virtual input plane in response to an operation of moving an operation position on the operation surface in a case in which the operation detection unit detects the operation, and the control unit stops generating the input data in a case in which the operation detection unit detects an operation corresponding to a preset ending condition,
wherein the operation surface is in a separate housing spaced from a housing of the display unit, and
wherein the control unit detects the operation position in a case in which the operation detection unit detects a touch of an operation body on the operation surface, and the control unit determines that the operation corresponds to the ending condition in a case in which the operation detection unit detects that the touch is released, and then a predetermined time passes after a detection is made that the touch is released and no further touching is detected.

12. The display apparatus according to claim 11,
wherein the input data generated by the control unit includes at least one of an input position on the virtual input plane, a movement direction of the input position inside the virtual input plane, and a movement speed of the input position inside the virtual input plane.

13. The display apparatus according to claim 12,
wherein the control unit sets at least one of the movement direction of the input position inside the virtual input plane and the movement speed of the input position inside the virtual input plane, which are included in the input data, according to a movement speed or a movement amount of the operation position detected by the operation detection unit.

14. The display apparatus according to claim 11,
wherein the operation detection unit detects a touch position as an operation position according to an operation of touching the operation surface with an operating body.

15. The display apparatus according to claim 11,
wherein the control unit is able to generate three-dimensional input data including the virtual input plane and a direction perpendicular to the virtual input plane according to an operation detected by the operation detection unit, and generates the input data including a component of the direction perpendicular to the virtual input plane in a case in which the operation detection unit detects an operation at a plurality of operation positions on the operation surface.

16. The display apparatus according to claim 11, further comprising:
an operation device that has the operation surface; and
a posture detection unit that detects a posture of the operation device or a change in the posture,
wherein the control unit changes correspondence between the operation surface and the virtual input plane in response to the posture of the operation device detected by the posture detection unit or the change in the posture.

17. The display apparatus according to claim 11,
wherein the virtual input plane is associated with a display region of the display unit, and
wherein the control unit causes the display unit to display an operation target display object and controls a display position of the display object in correspondence to the input data.

18. A method of controlling a display apparatus, the method comprising:
controlling the display apparatus including a display unit;
detecting an operation on an operation surface;
causing the display unit to display an operation target display object and controlling a display position of the display object in response to an operation on the operation surface; and
moving the display position of the display object in response to a change in an operation position on the operation surface and stopping moving the display position of the display object in a case in which an operation performed on the operation surface and corresponding to a preset ending condition is detected,
wherein the operation surface is in a separate housing spaced from a housing of the display unit, and
wherein the operation position is detected in a case in which a touch of an operation body on the operation surface is detected, and the operation corresponding to the ending condition is detected in a case in which the touch is released is detected, and then a predetermined time passes after a detection is made that the touch is released and no further touching is detected.

* * * * *